United States Patent
Koyama et al.

(10) Patent No.: US 8,364,077 B2
(45) Date of Patent: Jan. 29, 2013

(54) SEMICONDUCTOR DEVICE AND POSITION DETECTING METHOD USING THE SEMICONDUCTOR DEVICE

(75) Inventors: Jun Koyama, Sagamihara (JP); Shunpei Yamazaki, Setagaya (JP)

(73) Assignee: Semiconductor Energy Laboratory Co., Ltd., Atsugi-shi, Kanagawa (JP)

( * ) Notice: Subject to any disclaimer, the term of this patent is extended or adjusted under 35 U.S.C. 154(b) by 811 days.

(21) Appl. No.: 11/785,292

(22) Filed: Apr. 17, 2007

(65) Prior Publication Data

US 2007/0252208 A1    Nov. 1, 2007

(30) Foreign Application Priority Data

Apr. 28, 2006  (JP) ................................. 2006-126880

(51) Int. Cl.
*H04B 7/24* (2006.01)
(52) U.S. Cl. ....... 455/39; 455/41.1; 455/41.2; 455/41.3; 340/436; 340/471; 340/475; 340/10.1; 340/572.1; 340/572.2; 340/573
(58) Field of Classification Search ................. 455/41.2, 455/41.3, 41.1; 340/436, 471, 475, 10.1
See application file for complete search history.

(56) References Cited

U.S. PATENT DOCUMENTS

| 4,383,150 | A | * | 5/1983 | Cromer et al. | 218/145 |
| 4,903,162 | A | * | 2/1990 | Kopelman | 361/103 |
| 5,578,933 | A | | 11/1996 | Nonaka | |
| 5,874,785 | A | * | 2/1999 | Liu | 307/10.5 |
| 6,734,797 | B2 | * | 5/2004 | Shanks et al. | 340/572.4 |
| 7,023,342 | B2 | * | 4/2006 | Corbett et al. | 340/572.1 |
| 7,026,935 | B2 | * | 4/2006 | Diorio et al. | 340/572.2 |
| 2004/0056091 | A1 | * | 3/2004 | Overhultz et al. | 235/382 |

(Continued)

FOREIGN PATENT DOCUMENTS

| EP | 1 638 035 | 3/2006 |
| JP | 09-102765 A | 4/1997 |

(Continued)

OTHER PUBLICATIONS

Leong et al., "The reader collision problems in RFID systems", 2005 IEEE Internationalsymposium on Microwave, Antenna, Propagation and EMC Technologies for Wireless Communications Proceedings, 2005, pp. 658-661.*

(Continued)

*Primary Examiner* — Matthew Anderson
*Assistant Examiner* — Ganiyu A Hanidu
(74) *Attorney, Agent, or Firm* — Eric J. Robinson; Robinson Intellectual Property Law Office, P.C.

(57) ABSTRACT

An object of the present invention is to solve a problem of a conventional semiconductor device in that although information such as whether the semiconductor device exists in a predetermined space and information on an ID and the like included in the semiconductor device can be obtained, a position where the semiconductor is located in the predetermined space cannot be identified. The semiconductor device includes a signal sorting portion which sorts a signal based on a signal output from the outside and a signal detecting portion for detecting the signal output from the outside. In a structure of the semiconductor device including the signal sorting portion and the signal detecting portion, a position detecting system is developed base on signals from a plurality of interrogators.

9 Claims, 15 Drawing Sheets

U.S. PATENT DOCUMENTS

| | | | |
|---|---|---|---|
| 2004/0070501 A1* | 4/2004 | Degrauwe et al. | 340/572.1 |
| 2004/0145454 A1 | 7/2004 | Powell et al. | |
| 2005/0099269 A1* | 5/2005 | Diorio et al. | 340/10.51 |
| 2005/0253747 A1* | 11/2005 | Taki et al. | 342/42 |
| 2006/0017544 A1 | 1/2006 | Tanaka et al. | 340/10.2 |
| 2006/0022801 A1* | 2/2006 | Husak et al. | 340/10.5 |
| 2006/0068711 A1 | 3/2006 | Chiu et al. | |
| 2006/0099738 A1* | 5/2006 | Yamazaki | 438/114 |
| 2006/0267731 A1* | 11/2006 | Chen | 340/10.1 |
| 2007/0013522 A1 | 1/2007 | Chiu | |
| 2007/0018792 A1 | 1/2007 | Taki et al. | |
| 2007/0075834 A1* | 4/2007 | Armstrong et al. | 340/10.1 |
| 2007/0222609 A1* | 9/2007 | Duron et al. | 340/572.7 |
| 2007/0282482 A1* | 12/2007 | Beucher et al. | 700/225 |

FOREIGN PATENT DOCUMENTS

| | | |
|---|---|---|
| JP | 09-247737 A | 9/1997 |
| JP | 2000-149194 | 5/2000 |
| JP | 2005-316724 | 11/2005 |
| JP | 2006-503376 | 1/2006 |
| WO | WO 00/67208 | 11/2000 |
| WO | WO 2005/015257 | 2/2005 |

OTHER PUBLICATIONS

Strassner et al., "Passive 5.8 GHz Radio-Frequency Identification Tag for monitoring Oil Drill Pipe", IEEE Transactions on Microwave Theory and Techniques, vol. 51, No. 2, Feb. 2003, pp. 356-363.*
Search Report (Application No. 07007550.2) Dated Aug. 27, 2007.

* cited by examiner

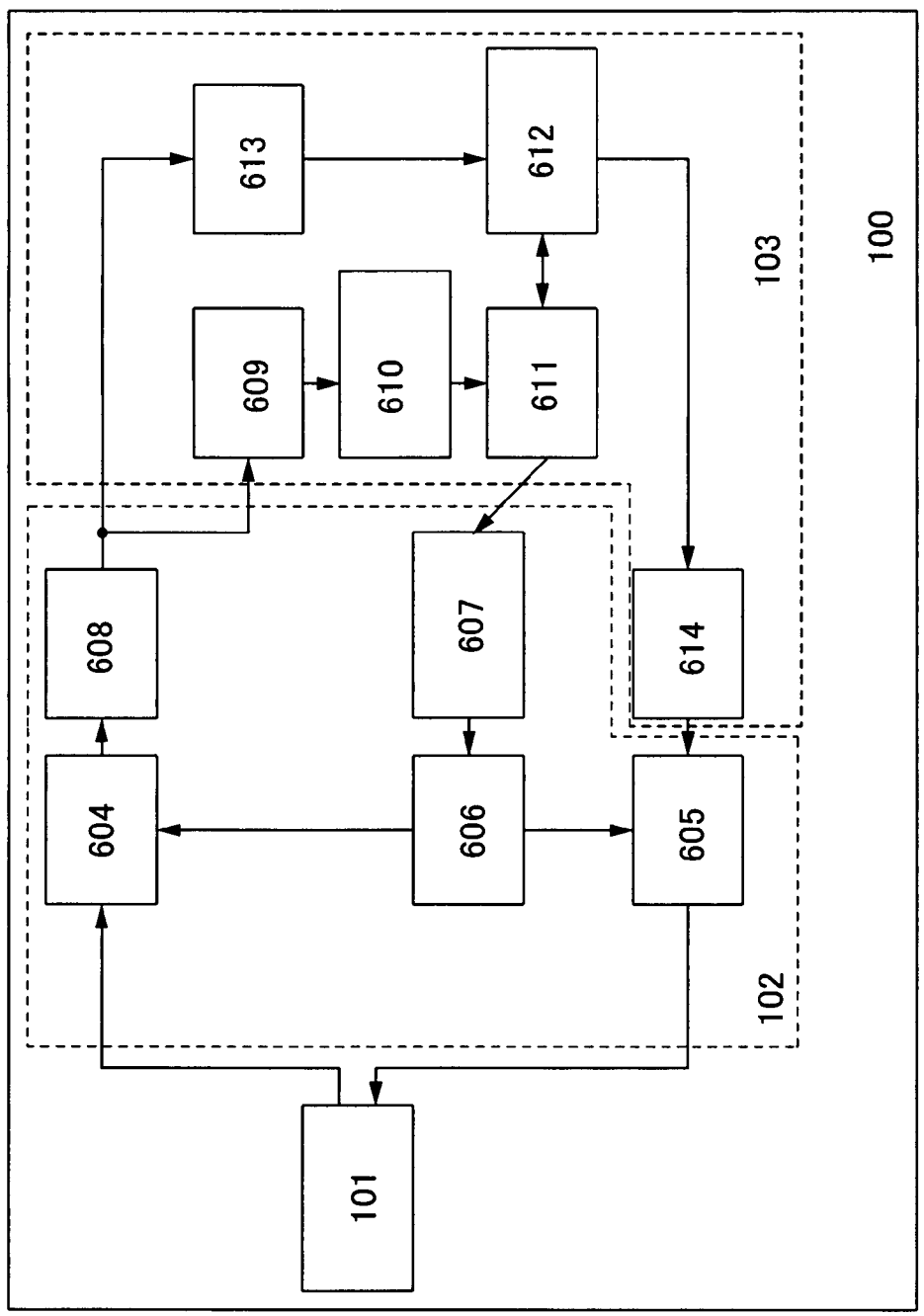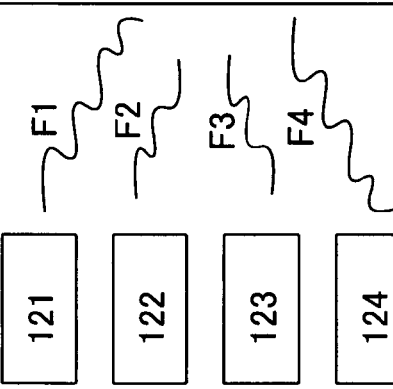
FIG. 7

SEMICONDUCTOR DEVICE AND POSITION DETECTING METHOD USING THE SEMICONDUCTOR DEVICE

BACKGROUND OF THE INVENTION

1. Field of the Invention

The present invention relates to a semiconductor device and a position detecting method using the semiconductor device. In particular, the present invention relates to a position detecting method using the semiconductor device which detects a position by a radio signal from a plurality of interrogators.

2. Description of the Related Art

Nowadays, an individual information identification technology using wireless communication through an electromagnetic field, a radio wave, or the like has attracted attention. In particular, as a semiconductor device which communicates data by wireless communication, an individual information identification technology using an RFID (Radio Frequency Identification) has attracted attention. A semiconductor device including an RFID (hereinafter simply referred to as a semiconductor device) is also called an IC (Integrated Circuit) tag, an IC chip, an RF tag, a wireless tag, or an electronic tag. The individual identification technology using a semiconductor device has started to help production, management, or the like of an individual object and has been expected to be applied to personal authentication.

Semiconductor devices can be divided into two types: an active semiconductor device which can transmit a radio wave or an electromagnetic wave containing information on the semiconductor device and a passive semiconductor device which is driven using electric power of an external radio wave or electromagnetic wave (carrier wave), depending on whether it incorporates a power supply or it is supplied with electric power externally (as for an active type RFID, see Patent Document 1, and as for a passive type RFID, see Patent Document 2). An active semiconductor device incorporates a power supply for driving the semiconductor device and includes a cell as the power supply. A passive semiconductor device generates electric power for driving the semiconductor device by using electric power of an external radio wave or electromagnetic wave (carrier wave), and a structure where a cell is not provided is realized.

FIG. 14 is a block diagram showing a specific structure of an active semiconductor device. In an active semiconductor device 1400 of FIG. 14, a communication signal received by an antenna circuit 1401 is input to a demodulation circuit 1405 and an amplifier 1406 in a signal processing circuit 1402. Normally, the communication signal is transmitted after processing such as ASK modulation or PSK modulation is performed on a carrier of 13.56 MHz, 915 MHz, or the like. Here, FIG. 14 shows an example where 13.56 MHz is employed for the communication signal. In FIG. 14, a clock signal is necessary as a reference in order to process a signal. Here, the carrier of 13.56 MHz is used as a clock. The carrier of 13.56 MHz is amplified by the amplifier 1406 and then supplied to a logic circuit 1407 as a clock. Further, the communication signal which has been ASK modulated or PSK modulated is demodulated by the demodulation circuit 1405. The demodulated signal is also transmitted to the logic circuit 1407 and analyzed. The signal analyzed by the logic circuit 1407 is transmitted to a memory control circuit 1408, and based on the signal, the memory control circuit 1408 controls a memory circuit 1409, retrieves data stored in the memory circuit 1409, and transmits it to a logic circuit 1410. The signal is encoded by the logic circuit 1410, and subsequently amplified by an amplifier 1411. In accordance with the signal, a modulation circuit 1412 modulates the carrier. A power supply in FIG. 14 is supplied by a cell 1403 provided outside the signal processing circuit 1402 through a power supply circuit 1404. The power supply circuit 1404 supplies electric power to the amplifier 1406, the demodulation circuit 1405, the logic circuit 1407, the memory control circuit 1408, the memory circuit 1409, the logic circuit 1410, the amplifier 1411, the modulation circuit 1412, and the like. In this manner, the active semiconductor device operates.

FIG. 15 is a block diagram showing a specific structure of a passive semiconductor device. In a passive semiconductor device 1500 of FIG. 15, a communication signal received by an antenna circuit 1501 is input to a demodulation circuit 1505 and an amplifier 1506 in a signal processing circuit 1502. Normally, the communication signal is transmitted after processing such as ASK modulation or PSK modulation is performed on a carrier of 13.56 MHz, 915 MHz, or the like. FIG. 15 shows an example where 13.56 MHz is used for the communication signal. In FIG. 15, a clock signal is necessary as a reference in order to process a signal. Here, the carrier of 13.56 MHz is used as a clock. The carrier of 13.56 MHz is amplified by the amplifier 1506 and then supplied to a logic circuit 1507 as a clock. Further, the communication signal which has been ASK modulated or PSK modulated is demodulated by the demodulation circuit 1505. The demodulated signal is also transmitted to the logic circuit 1507 and analyzed. The signal analyzed by the logic circuit 1507 is transmitted to a memory control circuit 1508, and based on the signal, the memory control circuit 1508 controls a memory circuit 1509, retrieves data stored in the memory circuit 1509, and transmits it to a logic circuit 1510. The signal is encoded by the logic circuit 1510, and subsequently amplified by an amplifier 1511. In accordance with the signal, a modulation circuit 1512 modulates the carrier. On the other hand, the communication signal transmitted to a rectifier circuit 1503 is rectified and then input to a power supply circuit 1504. The power supply circuit 1504 supplies electric power to the amplifier 1506, the demodulation circuit 1505, the logic circuit 1507, the memory control circuit 1508, the memory circuit 1509, the logic circuit 1510, the amplifier 1511, the modulation circuit 1512, and the like. In this manner, the passive semiconductor device operates.

[Patent Document 1]

Japanese Published Patent Publication No. 2005-316724

[Patent Document 2]

Japanese Translation of PCT International Application No. 2006-503376

SUMMARY OF THE INVENTION

The aforementioned conventional semiconductor device has a problem in that although information such as whether the semiconductor device exists in a predetermined space and information on an ID and the like included in the semiconductor device can be obtained, a position where the semiconductor is located in the predetermined space cannot be identified.

Objects of the present invention are to provide a semiconductor device which can detect a position in a predetermined space and a position detecting method using the semiconductor device.

In order to solve the foregoing problem, a semiconductor device of the invention includes a signal sorting portion which sorts signals output from the outside and a signal detecting portion for detecting the signals output from the outside. In a structure of the semiconductor device including the signal sorting portion and the signal detecting portion, a position detecting method is developed. Hereinafter, a specific structure of the invention is described.

One feature of the invention is a semiconductor device including an antenna circuit which receives signals from a plurality of interrogators, a signal sorting portion for sorting the signals from the plurality of interrogators, and a signal detecting portion for detecting intensity of the signals sorted by the signal sorting portion.

In the semiconductor device of the invention, the signals from the plurality of interrogators may have different frequency from each other.

In the semiconductor device of the invention, the signal sorting portion may include a MIX circuit, a bandpass filter, an oscillation circuit, and an oscillation frequency control circuit. Signals with different frequency, which are generated in the MIX circuit based on the signals from the plurality of interrogators and a signal from the oscillation circuit may be sorted by outputting through the bandpass filter.

In the semiconductor device of the invention, an amplifier circuit for amplifying a signal transmitted and received to/from the antenna circuit may be included.

In the semiconductor device of the invention, the signal detecting portion may include a demodulation circuit and a baseband signal processing circuit for decoding the signals from the plurality of interrogators, which is sorted by the signal sorting portion.

In the semiconductor device of the invention, the signal detecting portion may include a rectifier circuit, an A/D conversion circuit, and a CPU. The signal detecting portion may detect intensity of the signals sorted by the signal sorting portion when a signal output from the rectifier circuit is output to the CPU through the A/D conversion circuit.

One feature of a position detecting method of the invention is a position detecting method for detecting position information of a semiconductor device, based on signals from a plurality of interrogators. The semiconductor device includes an antenna circuit, a signal sorting portion, and a signal detecting portion. The position detecting method includes a step of receiving the signals from the plurality of interrogators by the antenna circuit; a step of sorting the signals received by the antenna circuit by the signal sorting portion; a step of detecting intensity of the signals sorted by the signal sorting portion by the signal detecting portion; and a step of detecting intensity of all signals from the plurality of interrogators and transmitting information on the intensity of the signals from the plurality of interrogators to one of the plurality of interrogators.

In the position detecting method of the invention, the signals from the plurality of interrogators may have different frequency from each other.

In the position detecting method of the invention, the signal sorting portion may include a MIX circuit, a bandpass filter, an oscillation circuit, and an oscillation frequency control circuit. Signals with different frequency, which are generated in the MIX circuit based on the signals from the plurality of interrogators and a signal from the oscillation circuit may be sorted by outputting through the bandpass filter.

In the position detecting method of the invention, the signal detecting portion may include a demodulation circuit and a baseband signal processing circuit for decoding the signals from the plurality of interrogators, which is sorted by the signal sorting portion.

In the position detecting method of the invention, the signal detecting portion may include a rectifier circuit, an A/D conversion circuit, and a CPU. The signal detecting portion may detect intensity of the signal sorted by the signal sorting portion when a signal output from the rectifier circuit is output to the CPU through the A/D conversion circuit.

In the position detecting method of the invention, the CPU may calculate a distance between the semiconductor device and the interrogator, based on intensity of the signals input to the CPU.

Note that in the invention, being connected means being electrically connected. Therefore, in a structure disclosed in the invention, another element which enables an electrical connection (for example, a switch, a transistor, a capacitor, an inductor, a resistor, a diode, or the like) may be provided in addition to a predetermined relation of connection.

Note that a semiconductor device in this specification refers to a device in general which functions by utilizing semiconductor characteristics.

According to the invention, not only individual information such as an ID included in the semiconductor device but also information on a position where the semiconductor is located in the predetermined space can be obtained. Further, position information of the semiconductor device is regularly detected, so that information on which a track of movement of equipment provided with the semiconductor device is followed can be obtained.

BRIEF DESCRIPTION OF THE DRAWINGS

FIG. 7 is a block diagram describing a structure of Embodiment Mode 2 of the invention.

DETAILED DESCRIPTION OF THE INVENTION

Figure 1:
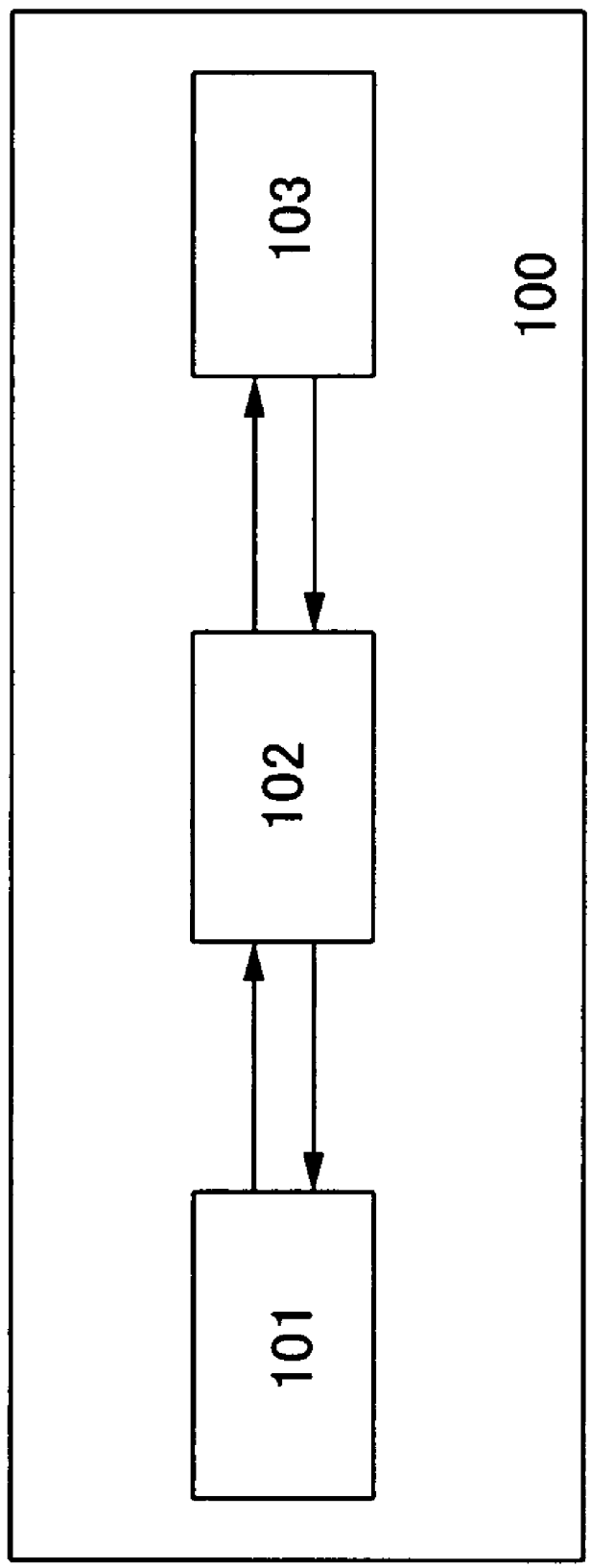
FIG. 1 is a block diagram showing a structure of Embodiment Mode 1 of the invention.

Hereinafter, embodiment modes and embodiments of the present invention will be described with reference to drawings. However, the present invention can be embodied in many different modes and it is easily understood by those skilled in the art that the mode and detail can be variously changed without departing from the scope and the spirit of the present invention. Therefore, the present invention is not construed as being limited to description of the embodiment modes and the embodiments. Note that the same portions or portions having a similar function are denoted by the same reference numerals and description of such portions is omitted.

[Embodiment Mode 1]

In this embodiment mode, a structure of a semiconductor device in the invention and a position detecting method using the semiconductor device of the invention are described.

FIG. 1 shows an embodiment mode of the invention. FIG. 1 shows a basic structure of the invention. A semiconductor device 100 in FIG. 1 includes an antenna circuit 101, a signal sorting portion 102, and a signal detecting portion 103.

The signal sorting portion 102 in FIG. 1 has a function to sort and output a signal received by the antenna circuit 101, from which transmitter can be obtained. The signal detecting portion 103 has a function to detect intensity of the signal output from the signal sorting portion 102, for example, a function to quantify and evaluate a voltage value of the signal output from the signal sorting portion 102. Note that a signal relating to the intensity of the signal received by the antenna circuit 101, which can be obtained by the signal detecting portion 103, is output from the antenna circuit 101 through the signal sorting portion 102.

Note that in this specification, a transmitter is an interrogator (also referred to as a reader/writer device and a R/W device). The interrogator has a function to output a signal with unique frequency and to receive a signal output from the semiconductor device.

Note that a shape of an antenna in the antenna circuit 101 is not specifically limited. That is, as a signal transmission method applied to the antenna circuit 101 in the semiconductor device 100, an electromagnetic coupling method, an electromagnetic induction method, a microwave method, or the like can be used. A transmission method can be sorted as appropriate by a practitioner in consideration of usage, and an antenna with an optimum shape and length may be provided in accordance with an adopted transmission method.

For example, when an electromagnetic coupling method or an electromagnetic induction method (for example, a 13.56 MHz band) is applied as the transmission method, electromagnetic induction caused by a change in magnetic field density is used. Therefore, a conductive layer functioning as an antenna is formed in an annular shape (for example, a loop antenna) or a spiral shape (for example, a spiral antenna).

Further, when a microwave method (for example, a UHF band (860 to 960 MHz band), a 2.45 GHz band, or the like) is employed as the transmission method, the shape such as a length of the conductive layer functioning as the antenna may be set as appropriate in consideration of a wavelength of an electromagnetic wave used for signal transmission, for example, the conductive layer functioning as the antenna can be formed in a linear shape (for example, a dipole antenna), a flat shape (for example, a patch antenna), or the like. The shape of the conductive layer functioning as the antenna is not limited to a linear shape, and may be formed in a curved-line shape, a meandering shape, or a combination thereof, in consideration of a wavelength of an electromagnetic wave.

Figure 2:
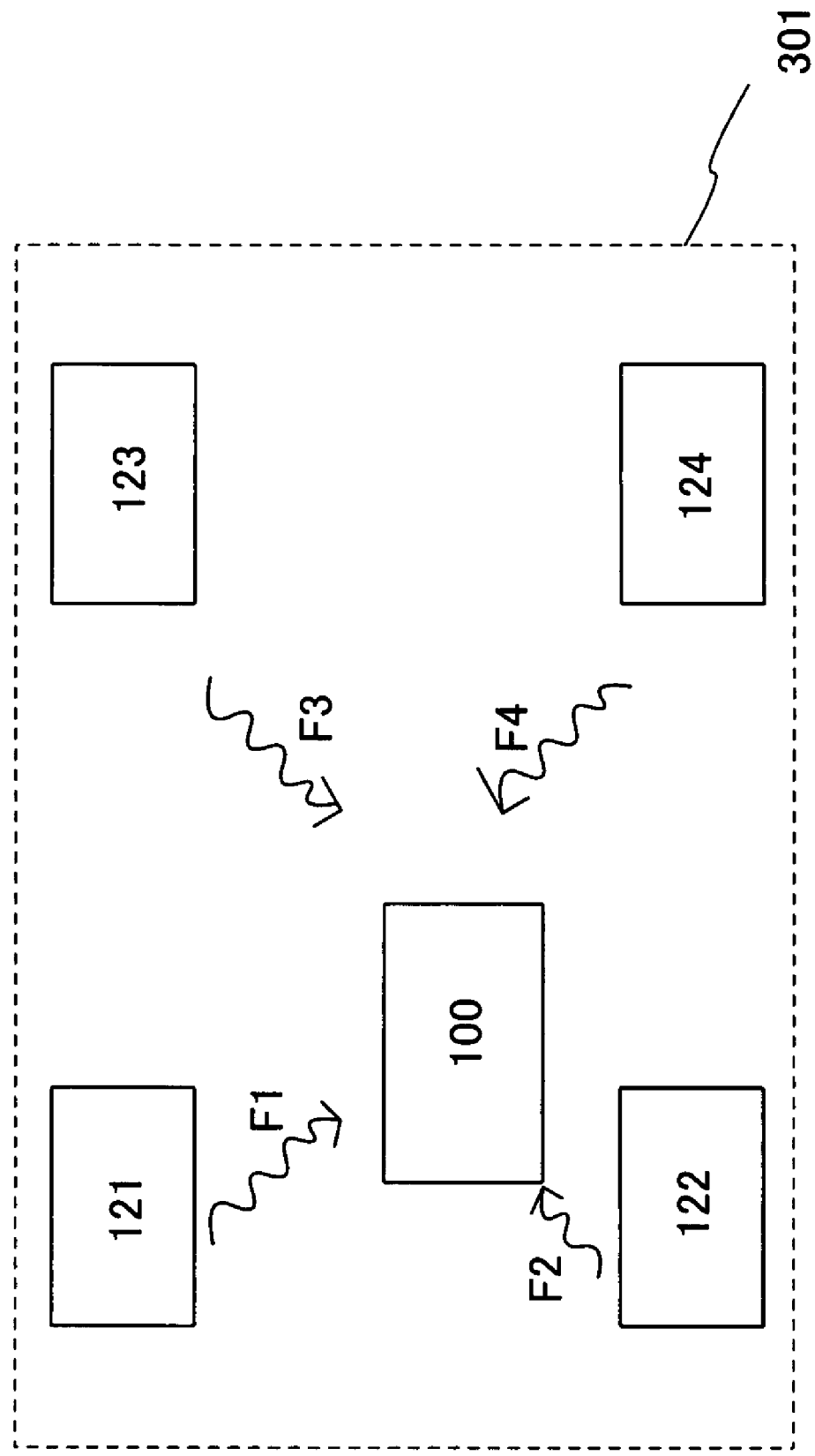
FIG. 2 is a block diagram describing a structure of Embodiment Mode 1 of the invention.

Next, a position detecting method using a semiconductor device of the invention and a plurality of interrogators is described. FIG. 2 schematically shows positions of the interrogators and the semiconductor device and communication of signals therebetween, for an understanding of a position detecting method of the invention. FIG. 2 shows an example where the semiconductor device 100 is surrounded by an interrogator 121, an interrogator 122, an interrogator 123, and an interrogator 124 in a space 201. Although four interrogators are shown here, the invention is not limited thereto.

In FIG. 2, the interrogator 121, the interrogator 122, the interrogator 123, and the interrogator 124 output a signal F1, a signal F2, a signal F3, and a signal F4 with different frequency from each other, respectively. Here, the signal F1, the signal F2, the signal F3, and the signal F4 have frequency f1, frequency f2, frequency f3, and frequency f4, respectively, and the frequency f1 to f4 is different from each other. When signals with different frequency are output from a plurality of interrogators, the signals are preferably in the same frequency band (transmission method) in consideration of a shape of an antenna in the semiconductor device which receives the signals.

Figure 3:
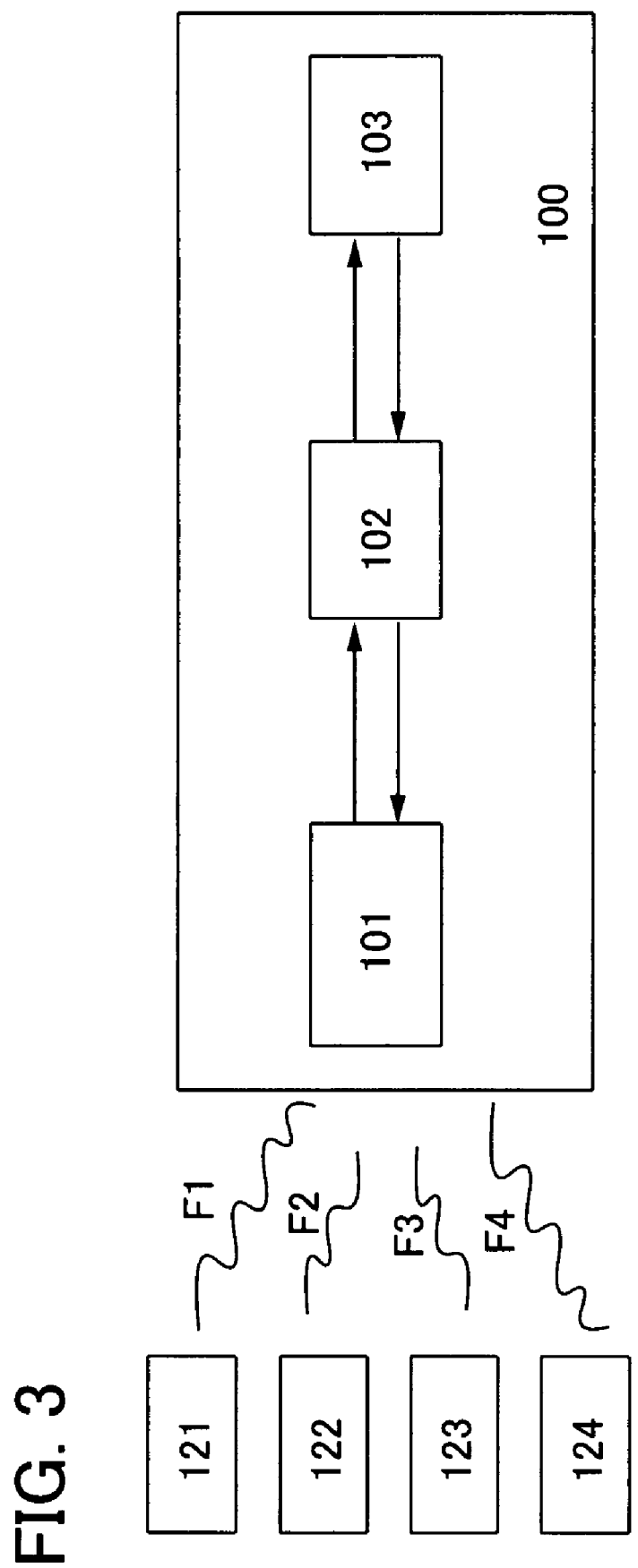
FIG. 3 is a block diagram describing a structure of Embodiment Mode 1 of the invention.

Next, a position detecting method of the invention is described with reference to FIGS. 3 and 4. FIG. 3 is a schematic diagram in which the semiconductor device having the structure of FIG. 1 receives the signal F1, the signal F2, the signal F3, and the signal F4 with different frequency, from the interrogator 121, the interrogator 122, the interrogator 123, and the interrogator 124. Note that the number of the interrogators is not limited to four as shown in FIG. 2. Therefore, in description of a flow chart of a position detecting method of the invention with reference to FIG. 4, a case is shown where n interrogators are provided and the semiconductor device receives signals with different frequency from first to n-th interrogators to detect position information of the semiconductor device.

Figure 4:
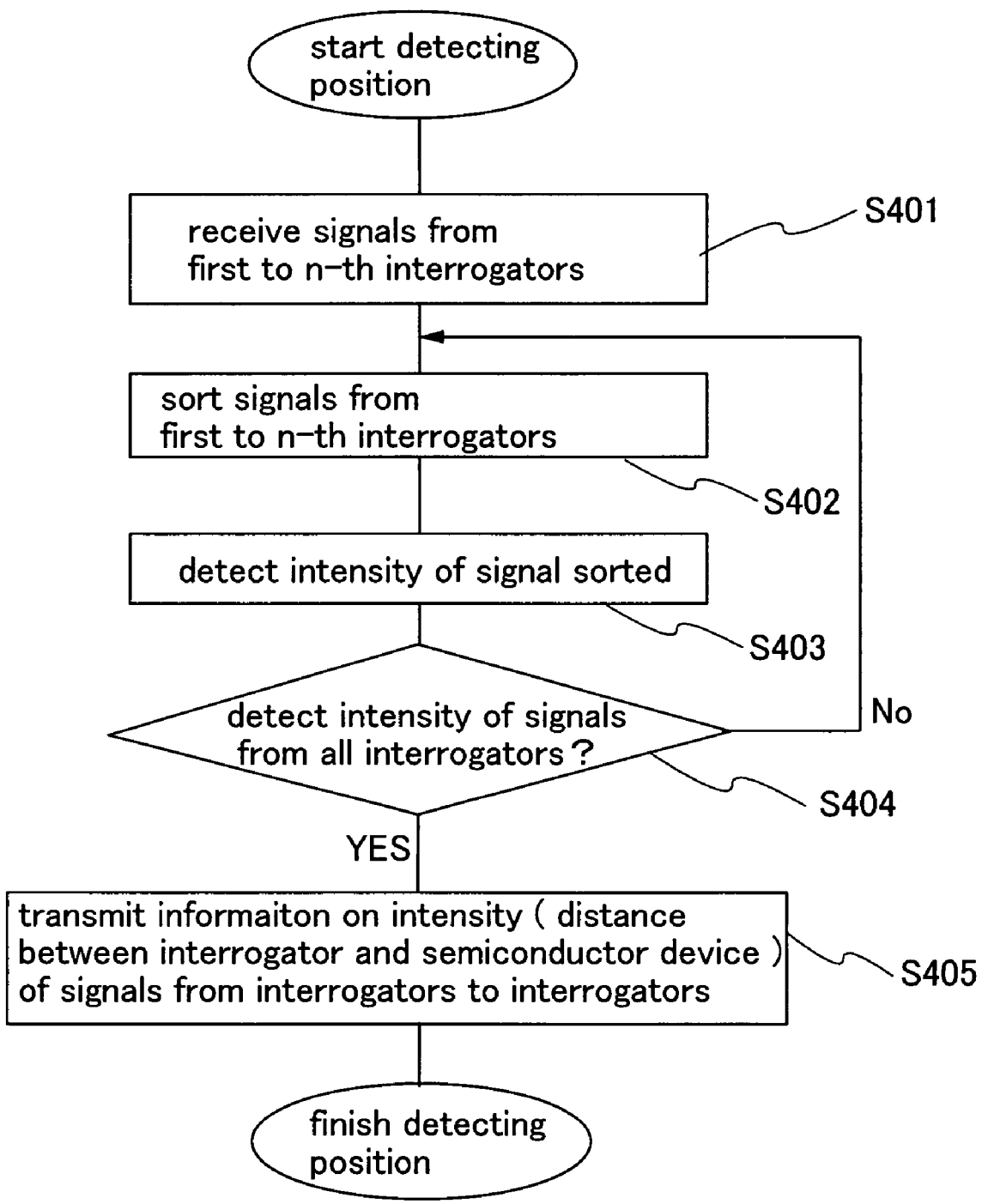
FIG. 4 is a flow chart describing a structure of Embodiment Mode 1 of the invention.

In FIG. 4, a flow chart of a position detecting method of the invention is described. In FIG. 4, in order to start position detection, each of the first to the n-th interrogators outputs a signal with different frequency from each other and the semiconductor device receives the signals with different frequency from the interrogators (a step S401).

Next, in the signal sorting portion in the semiconductor device, the signals with different frequency transmitted from the first to the n-th interrogators are sorted (a step S402).

Next, in the signal sorting portion, only the signal transmitted from an arbitrary interrogator is output, and intensity of the signal is detected by the signal detecting portion (a step S403).

In the step S402 in FIG. 4, sort of signals from the interrogators is performed on the signal from each interrogator, and therefore is necessary to be performed on each signal from all the interrogators. Accordingly, if sort of intensity of the signals from all the interrogators is not finished, the step S402 is performed again, and sort is performed on a signal from an interrogator, which is not sorted yet by the signal detecting portion (a step S404). For example, the semiconductor device sorts the signal from the first interrogator and outputs it to the signal detecting portion, and subsequently sorts a signal from the second interrogator and outputs it to the signal detecting portion. The signals from the interrogators are sorted by the signal sorting portion sequentially until the signal from the n-th interrogator is sorted.

In the step S404, a CPU (Central Processing Unit) provided in the signal detecting portion may judge whether the signals from all the interrogators are sorted and intensity thereof is detected as well as detects the signals. A result of judgment whether the signals from all the interrogators are sorted and intensity thereof is detected is fed back to the signal sorting portion, and the signal sorting portion sequentially sorts signals from interrogators which are not sorted yet.

Next, in the semiconductor device, in order to transmit from the antenna circuit to the interrogator information on the intensity of the signals from all the interrogators detected by the signal detecting portion, the information is output through the signal sorting portion and transmitted from the antenna circuit to the interrogator (a step S405). The information on the intensity of the signals from all the interrogators detected by the signal detecting portion is output to the interrogator near the semiconductor device, that is, the interrogator from which the signal with the strongest intensity is received by the signal detecting portion. It is preferable that the signal be transmitted to the interrogator nearest to the semiconductor device since power consumption required for transmitting the signal can be reduced.

Note that in the step S405 in FIG. 4, position information of the semiconductor device is calculated based on the information on the intensity of the signals from all the interrogators detected by the signal detecting portion, and the position information may be calculated by the CPU provided in the semiconductor device and transmitted to the interrogator.

Thus, the position of the semiconductor device can be detected based on the signals from the plurality of interrogators.

Figure 5:
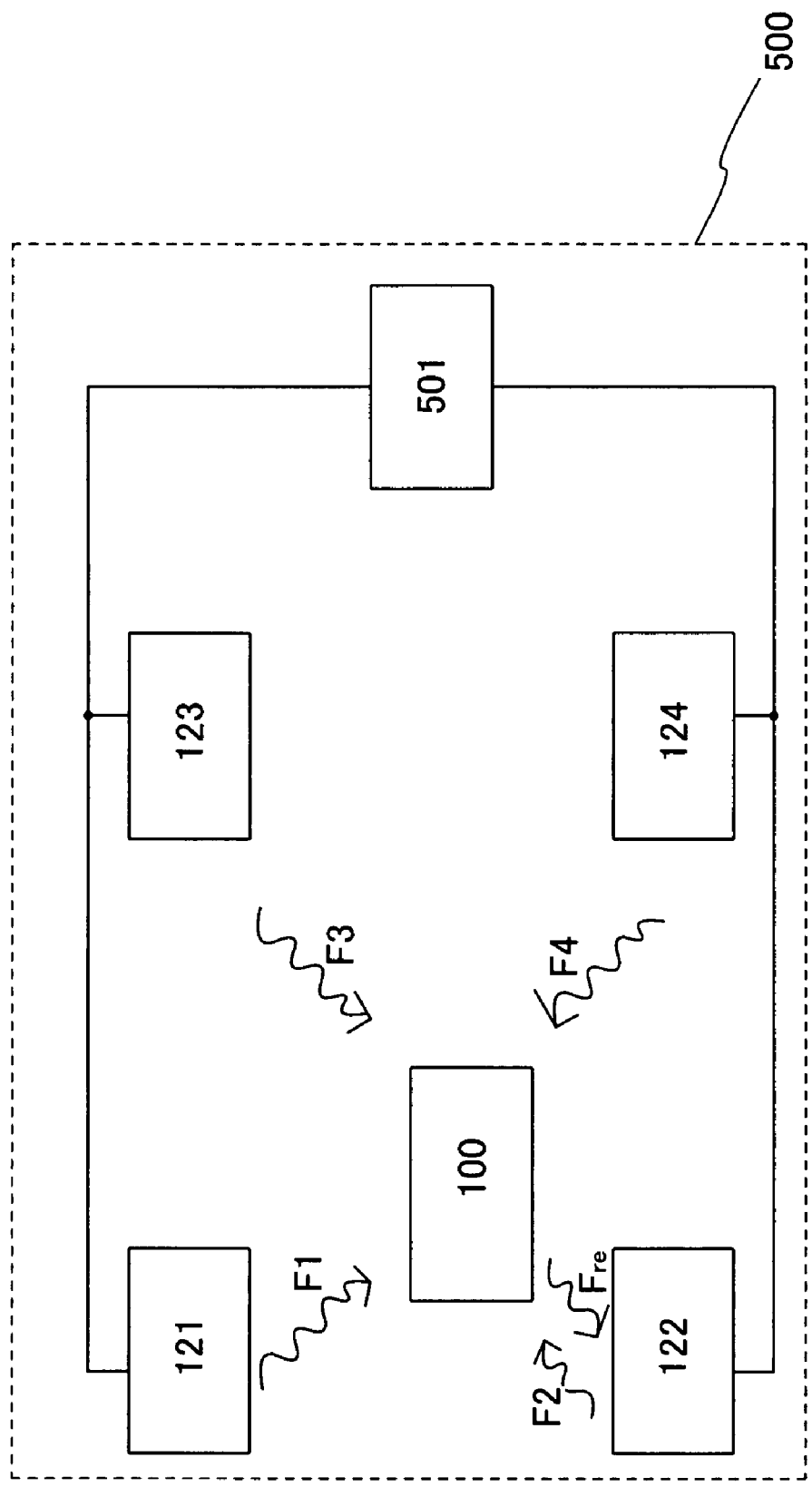
FIG. 5 is a block diagram describing a structure of Embodiment Mode 1 of the invention.

Next, a method of managing the position information of the semiconductor device output therefrom or the information on the intensity of the signals from the interrogators is described with reference to FIG. 5. FIG. 5 shows a relation between the interrogators 121 to 124, the semiconductor device 100, and a server 501.

By operation described in FIG. 4, the semiconductor device 100 in a space 500 provided with the interrogators sequentially receives the signals F1 to F4 from the interrogators 121 to 124, and transmits positional information of the semiconductor device output therefrom or information Fre on intensity of the signals from the interrogators. The interrogators 121 to 124 transmit information to the server 501 using LAN (Local Area Network) or the like. An administrator can know the position of the semiconductor device 100 by accessing the server 501. In the semiconductor device of the invention, the position information of the semiconductor device can be specified by the information on the intensity of the signals transmitted from the plurality of interrogators to the semiconductor device. Therefore, when the interrogators are arranged two-dimensionally, a two dimensional position of the semiconductor can be specified; and when the interrogators are arranged three-dimensionally, a three dimensional position of the semiconductor can be specified.

Figure 14:
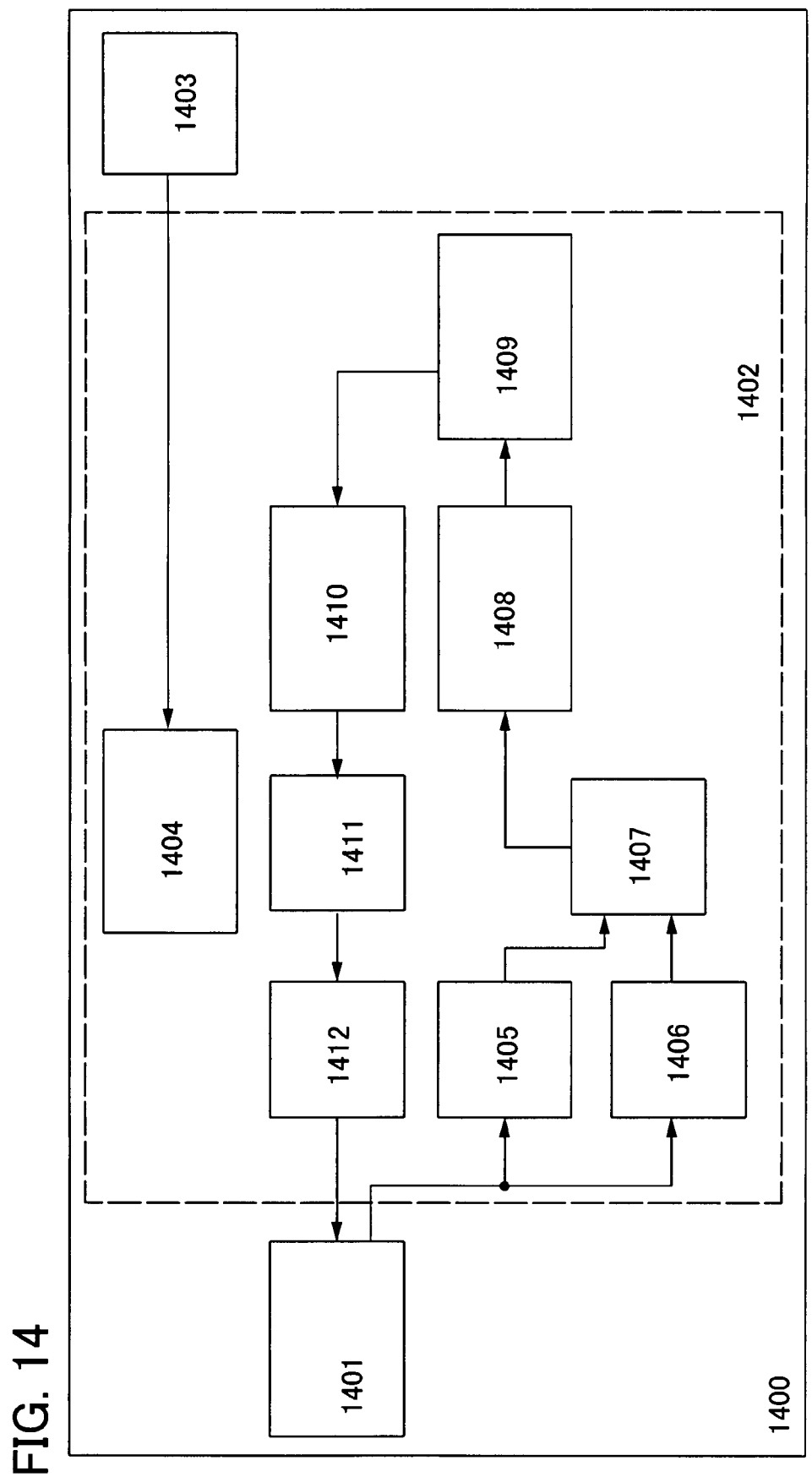
FIG. 14 is a block diagram describing a conventional structure.
Figure 15:
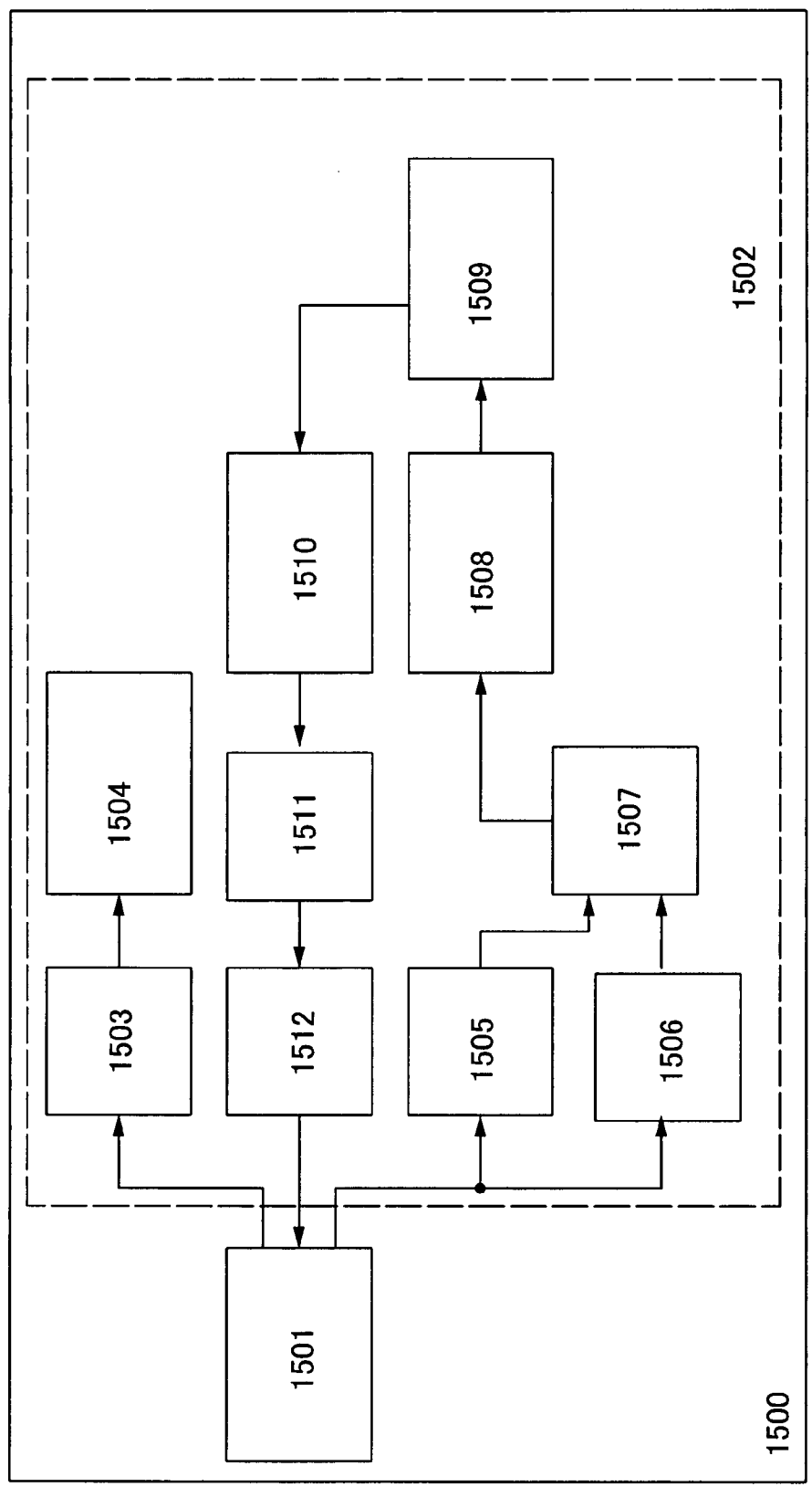
FIG. 15 is a block diagram describing a conventional structure.

In the semiconductor device of the invention, a power supply circuit in the structure of FIGS. 14 and 15 described as conventional structures may be provided although not shown in the drawing. In this case, considering that the signals are regularly transmitted and received between the semiconductor device of the invention and the interrogators, a structure where the semiconductor device is provided with a cell as an electric power supply means, in other words, an active semiconductor device is preferably adopted. Further, in the active semiconductor device, the cell is preferably a secondary battery which can be charged. When a secondary battery which can be charged is used, an antenna circuit for charging the battery is preferably provided. Since the semiconductor device of the invention has a structure where the semiconductor device regularly receives signals from the interrogators to detect intensity of the signals, the semiconductor device is preferably provided with a secondary battery such as a lithium ion battery and an antenna circuit for charging the battery so that the secondary battery can be regularly charged.

With the above-described structure of the invention, not only individual information such as an ID included in the semiconductor device but also information on a position where the semiconductor is located in a predetermined space can be obtained. Further, position information of the semiconductor device is regularly detected, so that information on following a track (also referred to as a flow line) of movement of equipment provided with the semiconductor device can be obtained.

[Embodiment Mode 2]

In this embodiment mode, specific structures of the semiconductor device and the position detecting method using the semiconductor device in the invention, which are shown in Embodiment Mode 1, are described. Note that in drawings used in this embodiment mode, the same portion as Embodiment Mode 1 may be denoted by the same reference numeral. A portion having a function similar to Embodiment Mode 1 is briefly described, and the description in Embodiment Mode 1 is used for detailed description.

Figure 6:
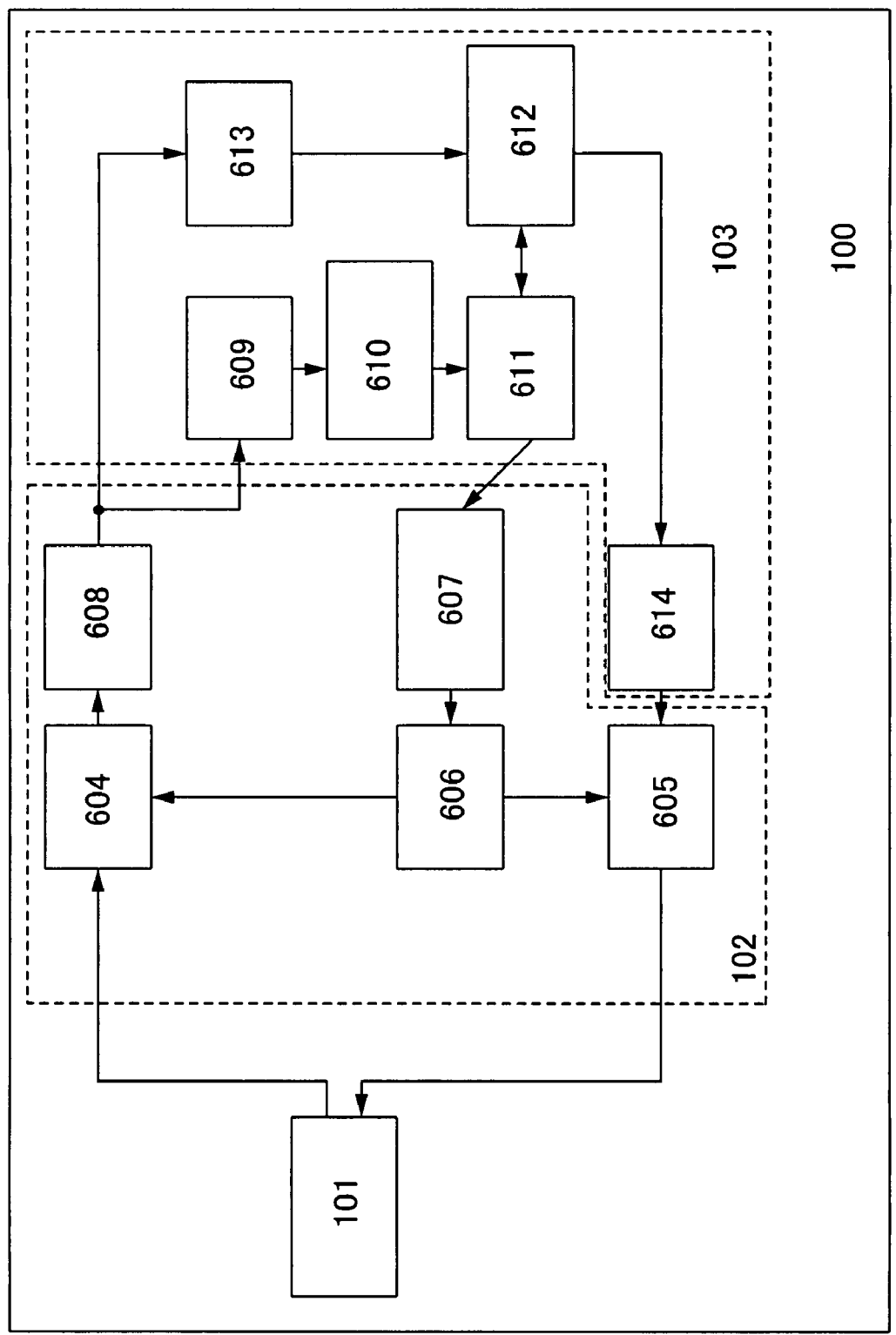
FIG. 6 is a block diagram describing a structure of Embodiment Mode 2 of the invention.

FIG. 6 shows an embodiment mode of the invention. FIG. 6 shows a specific structure of the basic structure of the invention, which is described in FIG. 1. The semiconductor device 100 in FIG. 6 includes the antenna circuit 101, the signal sorting portion 102, and the signal detecting portion 103 as main components, similar to FIG. 1.

The signal sorting portion 102 in FIG. 6 includes a MIX circuit 604 (also referred to as a frequency mixer or a mixer; hereinafter referred to as a MIX circuit), a MIX circuit 605, an oscillation circuit 606, an oscillation frequency control circuit 607, and a bandpass filter (hereinafter referred to as a BPF 608). The signal detecting portion 103 in FIG. 6 includes a rectifier circuit 609, an A/D conversion circuit 610, a CPU 611, a baseband signal processing circuit 612, a demodulation circuit 613, and a modulation circuit 614.

Hereinafter, operation of a position detecting method using the semiconductor device of the invention in FIG. 6 and a plurality of interrogators is described. Note that a relation between the semiconductor device of the invention and the plurality of interrogators is similar to that in the schematic diagram of FIG. 2 described in Embodiment Mode 1, and the description in Embodiment Mode 1 is used in this embodiment mode.

Note that the operation of the position detecting method using the semiconductor device of the invention and the plurality of interrogators is similar to that in the flow chart of FIG. 4 in Embodiment Mode 1. In this embodiment mode, a flow chart in a case where a signal from an arbitrary interrogator is sorted by the signal sorting portion and intensity of the signal is detected by the signal detecting portion.

FIG. 7 is a schematic diagram in which the semiconductor device 100 shown in FIG. 1 receives the signal F1, the signal F2, the signal F3, and the signal F4 with different frequency, from the interrogator 121, the interrogator 122, the interrogator 123, and the interrogator 124. Here, the signal F1, the signal F2, the signal F3, and the signal F4 have the frequency f1, the frequency f2, the frequency f3, and the frequency f4, respectively, and the frequency f1 to f4 is different from each other. When signals with different frequency are output from a plurality of interrogators, the signals are preferably in the same frequency band (transmission method) in consideration of a shape of an antenna in the semiconductor device which receives a signal. Note that the number of the interrogators is not limited to four as shown in FIG. 7. Therefore, in description of a flow chart of a position detecting method in this embodiment mode, which is described in FIG. 8, when a signal from an arbitrary interrogator is sorted by the signal sorting portion and intensity of the signal is detected by the signal detecting portion, a case is shown where the n interrogators are provided and the semiconductor device receives signals F1 to Fn with different frequency f1 to fn from the first to the n-th interrogators to detect position information of the semiconductor device. In this case, the arbitrary interrogator is a t-th interrogator, and the t-th interrogator outputs a signal Ft with frequency ft different from other frequency of the signals from other interrogators. Note that the frequency f1 to fn is different from each other.

Next, the position detecting method of the invention is described with reference to FIG. 8, in a case where the signal Ft with the frequency ft from the t-th interrogator is sorted by the signal sorting portion and intensity of the signal is detected by the signal detecting portion. Further, the flow chart of FIG. 8 is described in addition to operation of the structure shown in FIG. 7.

Figure 8:
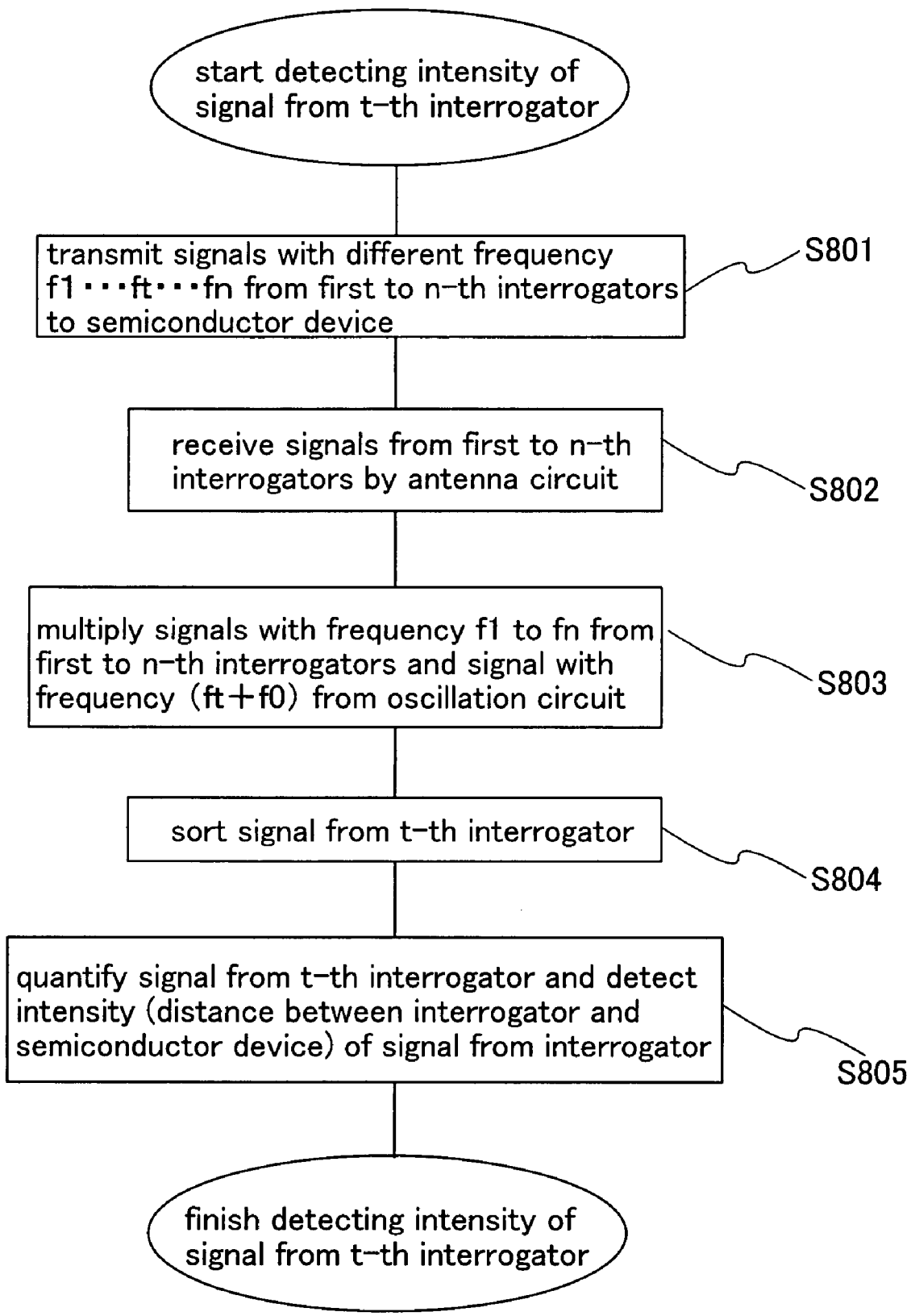
FIG. 8 is a flow chart describing a structure of Embodiment Mode 2 of the invention.

In FIG. 8, in order to start sorting the signal Ft with the frequency ft from the arbitrary t-th interrogator by the signal sorting portion and detecting intensity of the signal by the signal detecting portion, the first to the n-th interrogators output the signals F1 to Fn with different frequency f1 to fn to the semiconductor device (a step S801).

Next, in the semiconductor device, the signals F1 to Fn with different frequency f1 to fn transmitted from the first to the n-th interrogators are received by the antenna circuit (a step S802). Note that an antenna circuit preferably has high frequency band since it receives signals with different frequency from a plurality of interrogators. In addition, as described in Embodiment Mode 1, the signals transmitted from the plurality of interrogators are preferably in the same frequency band although frequency thereof is different from each other.

Next, in the semiconductor device, the signals received by the antenna circuit are input to the MIX circuit 604 in the signal sorting portion 102 of FIG. 7. In the MIX circuit 604, a signal from the oscillation circuit 606 and the signals from antenna circuit 101, which are transmitted from the plurality of interrogators, are multiplied (a step S803). Oscillation frequency of the oscillation circuit 606 is controlled by the oscillation frequency control circuit 607 and is variable. In description of FIG. 8, in order to sort the signal with the frequency ft from the arbitrary t-th interrogator by the signal sorting portion, the oscillation circuit 606 is controlled by the oscillation frequency control circuit 607 to have ft+f0 (f0 is arbitrary frequency) as frequency of the signal output from the oscillation circuit 606.

In the structure of FIG. 7, the signals input from the antenna circuit 101 are the frequency f1 of the signal F1, the frequency f2 of the signal F2, the frequency f3 of the signal F3, and the frequency f4 of the signal F4, which are output from the plurality of interrogators. Frequency of the signal from the oscillation circuit 606 is (f1+f0). In the MIX circuit 604, the signals with the frequency f1 to f4 and the signal with frequency f1+f0 are multiplied.

In order to describe the step S803 specifically, an example is hereinafter described with reference to FIG. 9, in which the signal F1 with the frequency f1, the signal F2 with the frequency f2, the signal F3 with the frequency f3, and the signal F4 with the frequency f4, which are output from antenna circuit 101 and have frequency different from each other, and the signal with frequency (f1+f0) output from the oscillation circuit 606 are multiplied, so that signals with different frequency are generated and the signal F1 with the frequency f1 received by the antenna circuit is sorted by passing through the BPF 608.

Figure 9:
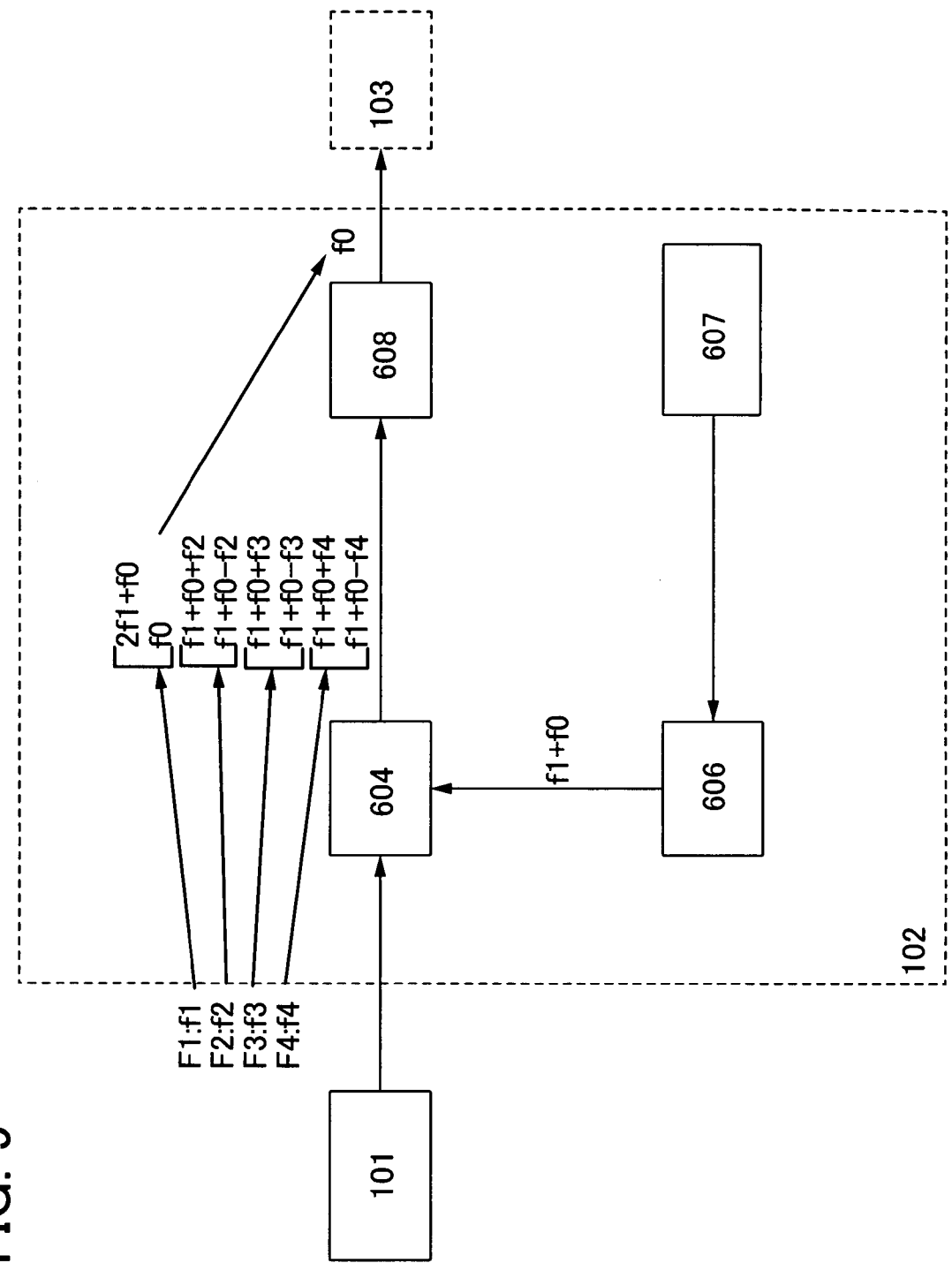
FIG. 9 is a block diagram describing a structure of Embodiment Mode 2 of the invention.

In FIG. 9, the antenna circuit 101 receives the signal F1 with the frequency f1, the signal F2 with the frequency f2, the signal F3 with the frequency f3, and the signal F4 with the frequency f4 from the interrogators 121 to 124, respectively, and output to the MIX circuit 604. Further, in order to sort the signal F1 with the frequency f1 by the signal sorting portion 102, the oscillation circuit 606 outputs the signal with frequency (f1+f0) by control of the oscillation frequency control circuit 607. In the MIX circuit, the signal from the antenna circuit and the signal from the oscillation circuit are multiplied, and signals converted to the sum and difference of frequency of the signals from the antenna circuit and from the oscillation circuit are output. This principle is known as the principle of a superheterodyne receiver.

In the MIX circuit 604, the frequency f1 of the signal F1 from the antenna circuit and the frequency (f1+f0) of the signal from the oscillation circuit are converted to the sum and difference thereof: signals with frequency (2f1+f0) and frequency f0, to be output. Similarly, in the MIX circuit 604, the frequency f2 of the signal F2 from the antenna circuit and the frequency (f1+f0) of the signal from the oscillation circuit are converted to the sum and difference thereof: signals with frequency (f1+f0+f2) and frequency (f1+f0−f2), to be output. Similarly, in the MIX circuit 604, the frequency f3 of the signal F3 from the antenna circuit and the frequency (f1+f0) of the signal from the oscillation circuit are converted to the sum and difference thereof: signals with frequency (f1+f0+f3) and frequency (f1+f0−f3), to be output. Similarly, in the MIX circuit 604, the frequency f4 of the signal F4 from the antenna circuit and the frequency (f1+f0) of the signal from the oscillation circuit are converted to the sum and difference thereof: signals with frequency (f1+f0+f4) and frequency (f1+f0−f4), to be output. That is, the signals with eight kinds of frequency are output from the MIX circuit 604.

The signals with eight kinds of frequency are transmitted to the BPF 608. Here, when the center frequency of the BPF is f0 and the BPF has steep attenuation, only f0 among eight kinds of frequency can pass through the BPF. If the signal F1 output from the interrogator 121 is modulated, the signal with the frequency f0 derives the modulation when passing through the MIX circuit 604. Generally speaking, the signal Ft with the frequency ft output from the t-th interrogator among the plurality of interrogators can be sorted (a step S804).

In FIG. 9, a method of sorting the signal F1 with the frequency f1 by the signal sorting portion is described. When the oscillation frequency of the oscillation circuit 606 is changed from (f1+f0) to (f2+f0), the signal F2 with the frequency f2 from the interrogator 122 can be sorted, similar to the aforementioned description. As an example, a case where the signal F2 with the frequency f2 from the interrogator 122 is sorted by the signal sorting portion is described with reference to FIG. 10.

Figure 10:
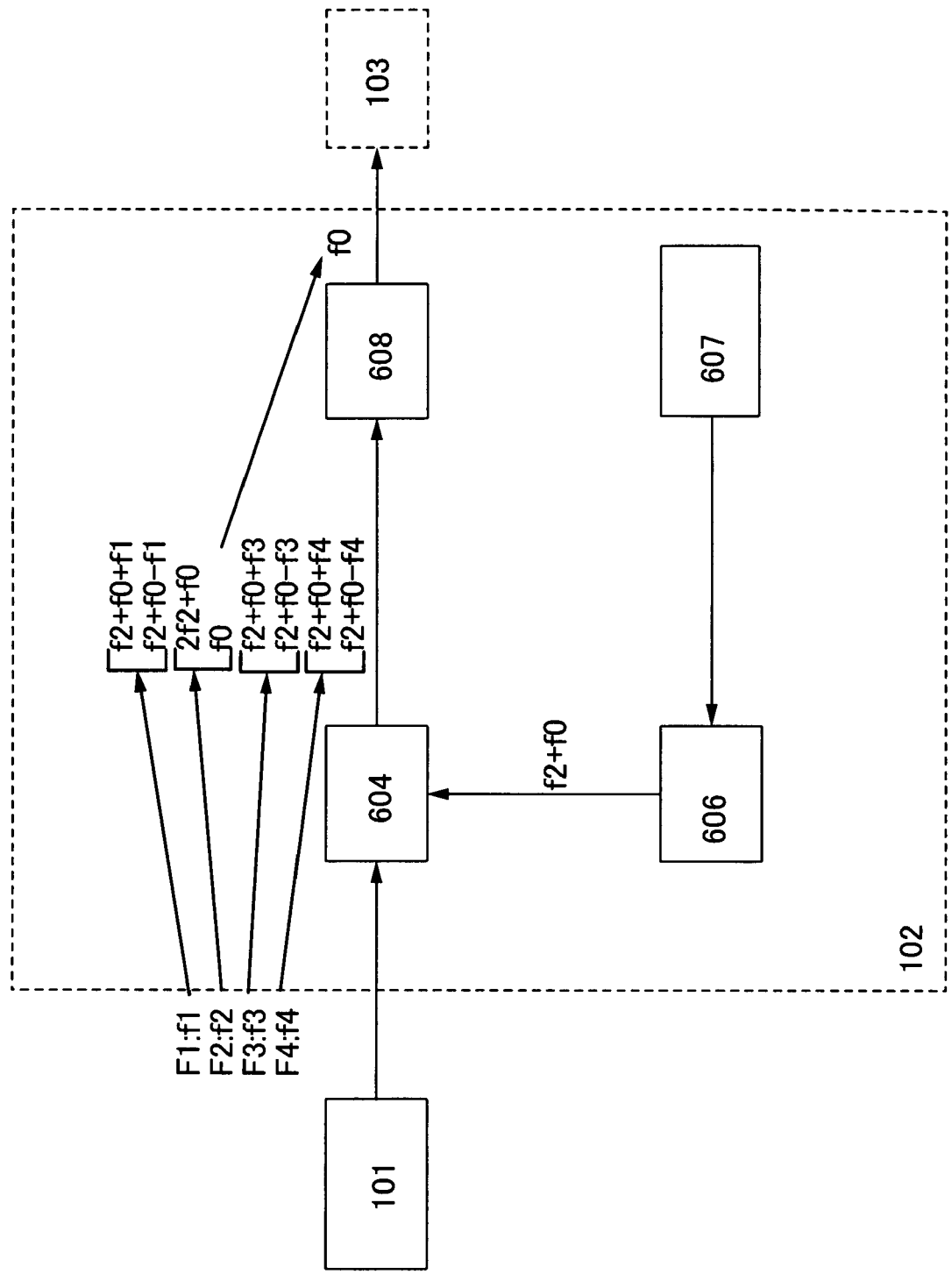
FIG. 10 is a block diagram describing a structure of Embodiment Mode 2 of the invention.

In FIG. 10, the antenna circuit 101 receives the signal F1 with the frequency f1, the signal F2 with the frequency f2, the signal F3 with the frequency f3, and the signal F4 with the frequency f4 from the interrogators 121 to 124, respectively, and outputs them to the MIX circuit 604. Further, in order to sort the signal F2 with the frequency f2 by the signal sorting portion 102, the oscillation circuit 606 outputs the signal with frequency (f2+f0) by control of the oscillation frequency control circuit 607. In the MIX circuit, the signals from the antenna circuit and the signal from the oscillation circuit are multiplied, and signals converted to the sum and difference of frequency of the signals from the antenna circuit and from the oscillation circuit are output.

In the MIX circuit 604, the frequency f1 of the signal F1 from the antenna circuit and the frequency (f2+f0) of the signal from the oscillation circuit are converted to the sum and difference thereof: signals with frequency (f2+f0+f1) and frequency (f2+f0−f1), to be output. Similarly, in the MIX circuit 604, the frequency f2 of the signal F2 from the antenna circuit and the frequency (f2+f0) of the signal from the oscillation circuit are converted to the sum and difference thereof: signals with frequency (2f2+f0) and frequency f0, to be output. Similarly, in the MIX circuit 604, the frequency f3 of the signal F3 from the antenna circuit and the frequency (f2+f0) of the signal from the oscillation circuit are converted to the sum and difference thereof: signals with frequency (f2+f0+f3) and frequency (f2+f0−f3), to be output. Similarly, in the MIX circuit 604, the frequency f4 of the signal F4 from the antenna circuit and the frequency (f2+f0) of the signal from the oscillation circuit are converted to the sum and difference thereof: signals with frequency (f2+f0+f4) and frequency (f2+f0−f4), to be output. That is, the signals with eight kinds of frequency are output from the MIX circuit 604.

The signals with eight kinds of frequency are transmitted to the BPF 608. Here, when the center frequency of the BPF is f0 and the BPF has steep attenuation, only f0 among eight kinds of frequency can pass through the BPF. If the signal F2 output from the interrogator 122 is modulated, the signal with the frequency f0 derives the modulation when passing through the MIX circuit 604. That is, the signal F2 output from the interrogator 122 can be sorted.

In addition, when the oscillation frequency of the oscillation circuit 606 is changed to (f3+f0) and (f4+f0), the signal F3 from the interrogator 123 and the signal F4 from the interrogator 124 can be sorted by the signal sorting portion, similar to the aforementioned description.

An output of the BPF 608 is input to the demodulation circuit 613 and the rectifier circuit 609. The demodulation circuit demodulates the modulated signal and inputs it to the baseband signal processing circuit 612. In the rectifier circuit 609, the output signal from the BPF 608 is half-wave rectified and then smoothed. That is, the rectifier circuit 609 is for rectifying and smoothing a signal input thereto and converting an output signal into a direct current signal. A direct current voltage is generated in accordance with amplitude of the signal. The direct current voltage is converted to a digital signal by the A/D conversion circuit 610, and a direct current voltage level is judged by the CPU 611. Thus, intensity of the signal from the interrogator 121 can be detected, and the CPU 611 can calculate a distance between the interrogator 121 and the semiconductor device (a step S805). Note that as described in FIG. 5 in Embodiment Mode 1, if the CPU 611 does not calculate a distance between the semiconductor device and interrogators other than the interrogator 121 yet, the CPU 611 sorts and detects a signal through the oscillation frequency control circuit 607 and calculates a distance between the semiconductor device and another interrogator. The CPU 611 is not necessarily calculate a distance and may calculate only intensity of a signal.

By the steps shown in FIG. 8, intensity of the signal Ft with the frequency ft from the arbitrary t-th interrogator is detected, so that a distance between the t-th interrogator and the semiconductor device can be calculated. If a distance between the semiconductor device and another interrogator does not finished to be calculated, the CPU 611 changes the signal output from the oscillation circuit 606 to sort a signal from the interrogator, and calculates a distance between the semiconductor device and the interrogator.

A result of calculating the distance between the interrogators 121 to 124 and the semiconductor device 100, which is obtained by the CPU 611, is output to the interrogator through the baseband signal processing circuit 612.

The baseband signal processing circuit 612 decodes contents of the signals from the plurality of the interrogators through the demodulation circuit 613 and makes a judgment as the semiconductor device. That is, it can be said that the baseband signal processing circuit 612 has functions similar to the logic circuit 1407, the memory control circuit 1408, the memory circuit 1409, and the logic circuit 1410 in the structure of FIG. 14 described as the conventional structure.

For transmission of a signal such as position information of the semiconductor device in response to a signal input to the semiconductor device, an output signal of the baseband signal processing circuit 612 is modulated by the modulation circuit 614. Frequency of non-modulated wave is referred to as f0. A signal modulated by the MIX circuit 605 and the signal from the oscillation circuit are multiplied and input to the antenna circuit 101. The oscillation frequency of the oscillation circuit is (f1+f0) as described above; therefore, frequency of the output signal of the MIX circuit is f1 and (f1+2f0). Communication is performed with use of f1.

The signal F1 with the frequency f1 is received by the interrogator 121 and its content can be identified. Needless to say, the signal may be output to the nearest interrogator by control of the oscillation circuit input to the MIX circuit 605, that is, by the control of the baseband signal processing circuit 612. For example, in the positional relation between the semiconductor device and the interrogators described in FIG. 5 in Embodiment Mode 1, a structure where the signal is output to the interrogator 122 is preferably employed.

In addition, a means of managing the position information of the semiconductor device output therefrom or the information on the intensity of the signals from the interrogators is similar to that in FIG. 5 shown in Embodiment Mode 1 and the description of FIG. 5, and description thereof is omitted in this embodiment mode.

In the semiconductor device of the invention, a power supply circuit in the structure of FIGS. 14 and 15 described as conventional structures may be provided although not shown in the drawing. In this case, considering that the signals are regularly transmitted and received between the semiconductor device of the invention and the interrogators, a structure where the semiconductor device is provided with a cell as an electric power supply means, in other words, an active semiconductor device is preferably adopted. Further, in the active semiconductor device, the cell is preferably a secondary battery which can be charged. When a secondary battery which can be charged is used, an antenna circuit for charging the battery is preferably provided. Since the semiconductor device of the invention has a structure where the semiconductor device regularly receives signals from the interrogators to detect intensity of the signals, the semiconductor device is preferably provided with a secondary battery such as a lithium ion battery and an antenna circuit for charging the battery so that the secondary battery can be regularly charged.

With the above-described structure of the invention, not only individual information such as an ID included in the semiconductor device but also information on a position where the semiconductor is located in a predetermined space can be obtained. Further, position information of the semiconductor device is regularly detected, so that information on following a track (also referred to as a flow line) of movement of equipment provided with the semiconductor device can be obtained.

[Embodiment Mode 3]

In this embodiment mode, structures of the semiconductor device in the invention and the position detecting method using the semiconductor device of the invention, which are different from those shown in Embodiment Mode 2, are described. Note that in drawings used in this embodiment mode, the same portion as Embodiment Modes 1 and 2 may be denoted by the same reference numeral. A portion having a function similar to Embodiment Modes 1 and 2 is briefly described, and the description in Embodiment Modes 1 and 2 is used for detailed description.

Figure 11:
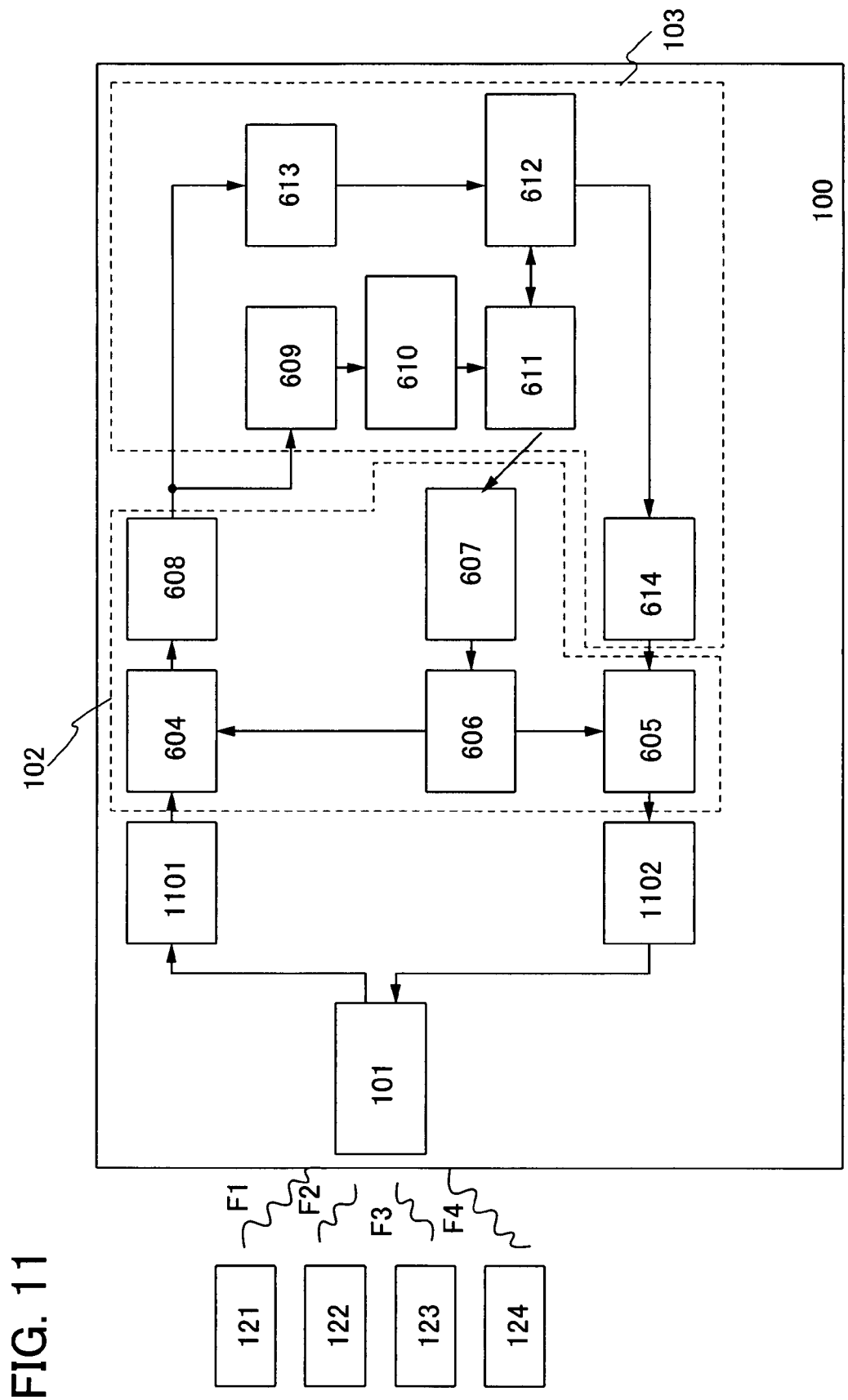
FIG. 11 is a block diagram describing a structure of Embodiment Mode 3 of the invention.

FIG. 11 shows an example where an amplifier circuit 1101 is interposed between the antenna circuit 101 and the MIX circuit 604, and an amplifier circuit 101 is interposed between the antenna circuit 101 and the MIX circuit 605. The structure is similar to the structure of FIG. 7 and the flow chart of FIG. 8 shown in Embodiment Mode 2, except that the amplifier circuits 1101 and 1102 are provided, and the description of FIGS. 7 and 8 is used for detailed description. Therefore, in this embodiment mode, advantages of interposing the amplifier circuits shown in FIG. 11 is described.

In a structure shown in FIG. 11, signal processing can be performed favorably with provision of the amplifier circuit 1101, even if a signal from the antenna circuit 101 is small. In accordance with increasing distance between the semiconductor device and the interrogator, a signal transmitted to the semiconductor device from the interrogator is attenuated and it becomes difficult for the semiconductor device to read the signal. In this case, with the structure where the amplifier circuit 1101 is provided, the signal received by the antenna circuit antenna circuit 101 can be amplified and output to the MIX circuit 604.

Further, in the structure shown in FIG. 11, with provision of the amplifier circuit 1102, the signal can be transmitted favorably and received by the interrogator even if a distance from the antenna circuit 101 to the interrogator is large. In accordance with increasing distance between the semiconductor device and the interrogator, a signal transmitted to the interrogator from the semiconductor device is attenuated and it becomes difficult for the interrogator to read the signal. In this case, with the structure where the amplifier circuit 1102 is provided, the signal transmitted from the antenna circuit 101 can be amplified and output to the antenna circuit.

In addition, there is a synergistic effect of the semiconductor device having the structure of FIG. 11 and the position detecting method in the invention that a signal transmitted to the interrogator nearest to the semiconductor device can be chosen to be transmitted. The semiconductor device of the invention can selectively transmit the signal to the nearest interrogator. Therefore, when the distance between the interrogator and the semiconductor device is close, an amplification factor of the amplifier circuit 1102 is lowered and the nearest interrogator is chosen, so that the signal can be transmitted with small electric power. Thus, power consumption of the semiconductor device can be reduced.

Accordingly, in the invention, the amplifier circuit preferably has a function to vary a factor (amplification factor) for amplifying electric power of a signal and to adjust the electric power of the signal output.

Note that this embodiment mode can be freely implemented in combination with the aforementioned embodiment modes. Therefore, not only individual information such as an ID included in the semiconductor device but also information on a position where the semiconductor is located in a predetermined space can be obtained. Further, position information of the semiconductor device is regularly detected, so that information on which a track (also referred to as a flow line) of movement of equipment provided with the semiconductor device is followed can be obtained. A signal can be reliably communicated between the interrogator and the semiconductor device, and a signal can be reliably transmitted to the interrogator with a long distance from the semiconductor device in particular by adapting this embodiment mode. In addition, this embodiment mode is extremely useful in that small electric power which is transmitted from the amplifier circuit is output when the signal is transmitted from the semiconductor device to the interrogator close thereto, so that power consumption can be reduced.

[Embodiment 1]

Hereinafter, an embodiment of the invention is described.

Figure 12:
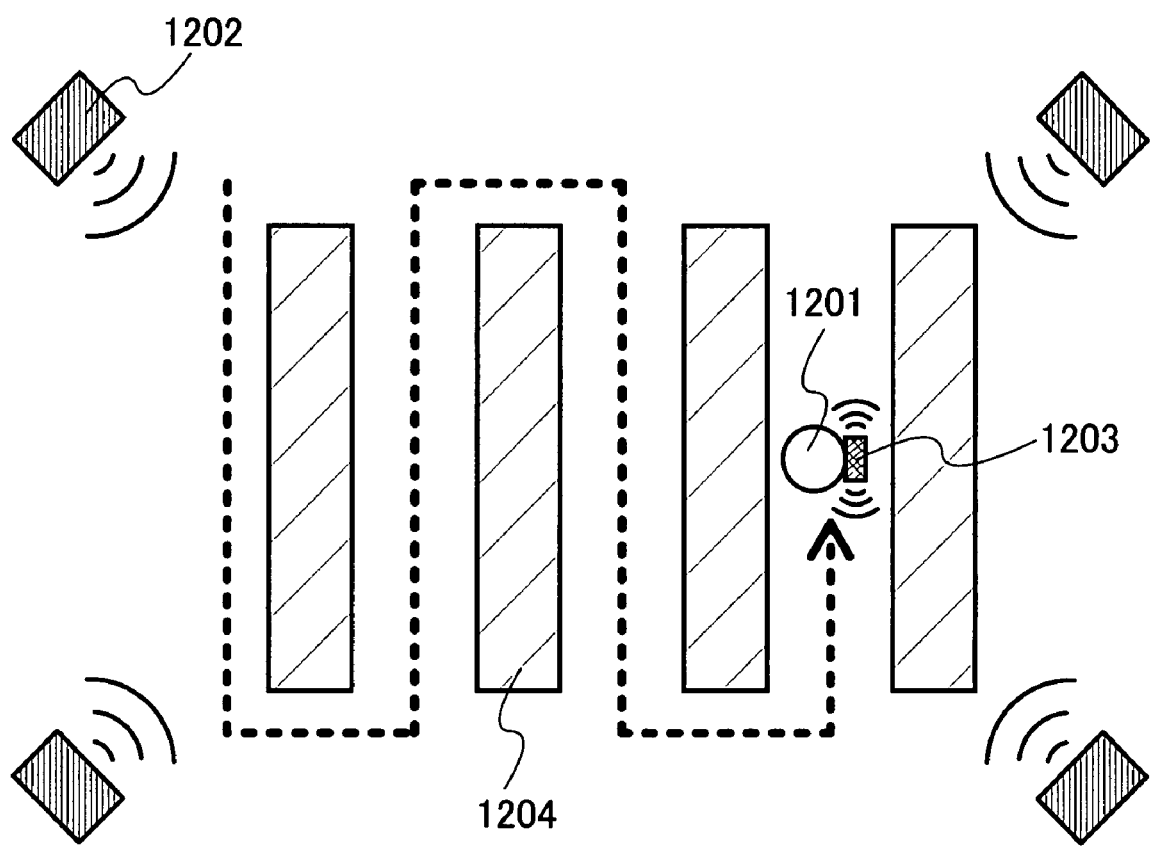
FIG. 12 is an explanatory diagram describing a structure of Embodiment 1 of the invention.

In this embodiment, a product management system and a management system of a moving object in a room or the like are described as an example of using the semiconductor device and the position detecting method according to the invention, with reference to FIG. 12.

First, a case where a customer purchases a product in a store is described with reference to FIG. 12. The semiconductor device of the invention as well as an ID label or an ID tag incorporating information such as product-specific information or production history are attached to a product displayed in the store.

A customer 1201 having a product 1203 provided with the semiconductor device of the invention moves in the store surrounded by interrogators 1202 for position detection, which are provided in the store. As shown in the aforementioned embodiment modes, a manager can manage a flow line of the customer 1201 moving around display cabinets 1204 by detecting a position of the semiconductor device by the interrogators 1202 provided in the store. It is preferable to record and manage the flow line of the customer since marketing such as a location for providing a product and product management can be performed efficiently.

As shown in this embodiment mode, a flow line of the product in the store is in real time by a plurality of interrogators provided in the store, so that theft can be prevented without the customer going through a gate of an interrogator for preventing theft from the display cabinets. Further, since the flow line of the product can be observed in real time, the manager can forecast information on move of a thief in advance with use of a computer or the like, and take measures such as blocking the passage, and thus, theft of the product can be prevented. Accordingly, the manager can capture the thief without directly catching the thief, and thereby the thief can be easily caught.

In this embodiment, the manager can manage position information of the product in real time without providing a gate-shaped interrogator at a doorway and without the customer noticing an interrogator, if the interrogator is provided in a part of tiles of a floor, a part of pillars, a ceiling, or the like. By the position detecting method using the semiconductor device of the invention, a flow line of the product in a small area, which is difficult for a GPS or the like to trace, can be easily traced. Further, the semiconductor device of the invention can cover range of several m when an antenna for the UHF band is used. Further, it is preferable that the semiconductor device of the invention have a collision avoidance function since a plurality of moving objects can also be managed.

A position detecting method using the semiconductor device of the invention is effective in preventing theft by using together with a surveillance camera or the like. The manager can perform management from a remote place more certainly and easily.

In addition, it is preferable that an accurate flow line of a product provided with the semiconductor device can be observed easily even in a large space by increase in the number of the plurality of interrogators in the invention.

This embodiment can be freely implemented in combination with the aforementioned embodiment modes.

[Embodiment 2]

Figure 13:
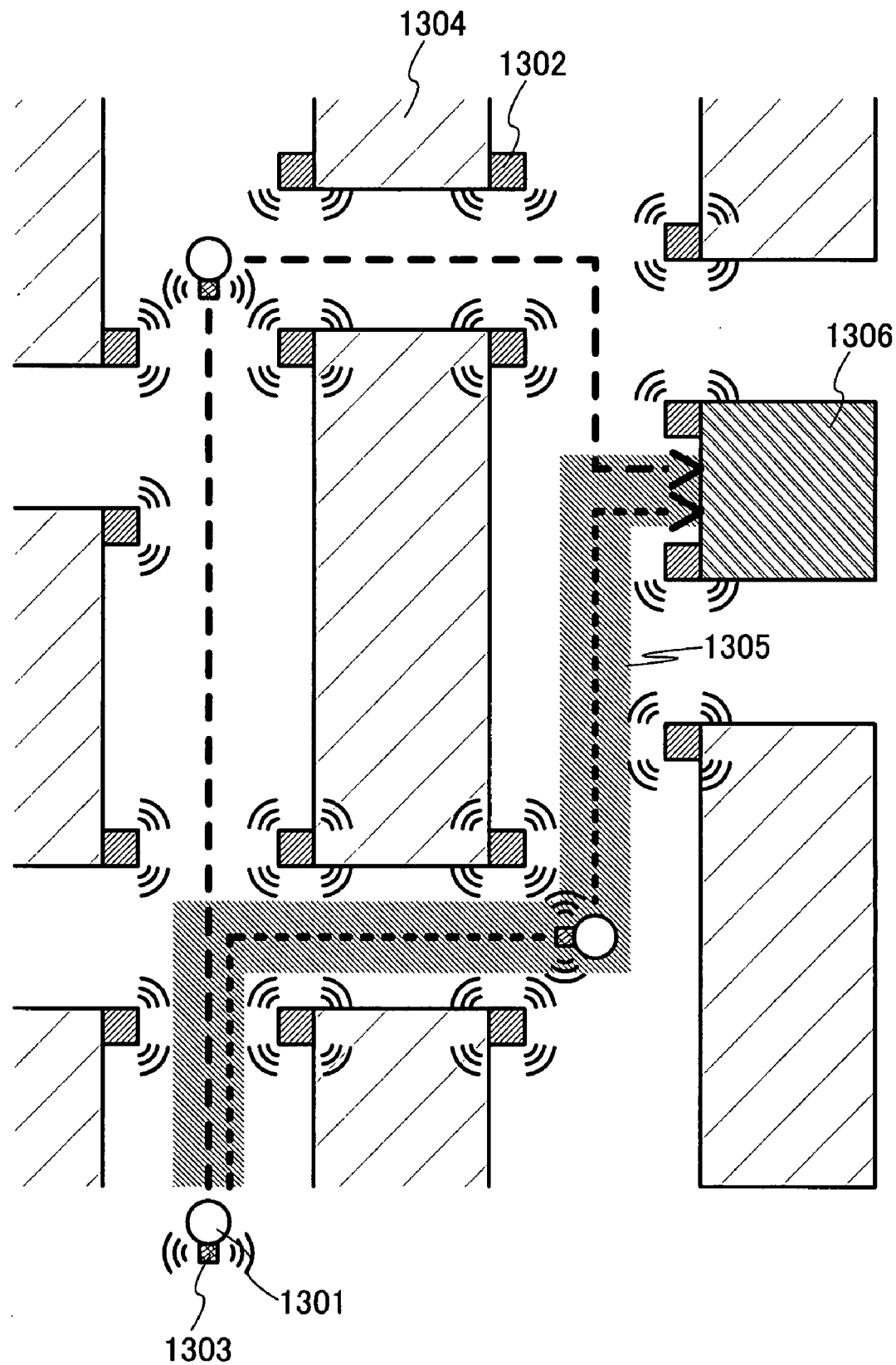
FIG. 13 is an explanatory diagram describing a structure of Embodiment 2 of the invention.

In this embodiment, a management system of a moving object in a passage or the like is described as an example of using the semiconductor device and the position detecting method according to the invention, with reference to FIG. 13.

First, an example where a manager manages a flow line of the moving object in the passage is described with reference to FIG. 13. The moving object is provided with the semiconductor device of the invention as well as an ID label or an ID tag incorporating specific information.

Hereinafter, an example of a management system of a moving object in a passage or the like is described with reference to FIG. 13.

A moving object 1301 having a semiconductor device 1303 of the invention moves in a space surrounded by interrogators 1302 for position detection, which are provided in a passage. Needless to say, a mode in which the moving object 1301 having equipment provided with the semiconductor device 1303 of the invention moves is similar to this embodiment. As shown in the aforementioned embodiment modes, a manager can manage flow line in which the moving object 1301 moves along the passage separated by obstructions by detecting a position of the semiconductor device of the invention by the interrogators 1302 provided in the passage. Further, speed and a tendency of the moving object can be observed. In FIG. 13, a case where the moving object 1301 reaches a destination 1306 through a pass shown by slanted lines is shown, and for example, move of the moving object following another path without following the path shown in the slanted lines can be easily observed in real time. The flow line of the object can be managed and recorded. Therefore, it is preferable that marketing such as product management can be performed efficiently when the moving object is a customer having a product provided with the semiconductor device. In the invention, when one object among an unspecified number of moving objects is provided with the semiconductor device, move of the moving object can be managed. Thus, when the semiconductor device is attached to a small child, move of the child in a crowd can be managed successively.

In FIG. 13, as an object of the moving object 1301 to which the semiconductor device is attached, a criminal in prison, a person in need of care in a nursing home, and the like are considered. It is particularly effective that a flow line of a criminal in prison or a person in need of care in a nursing home can be managed, for example, when the semiconductor device of the invention is attached to the criminal in prison or the person in need of care in the nursing home, and the position detecting method of the invention is used for management. By the position detecting method using the semiconductor device of the invention, with respect to the criminal in prison, suspicious movement can be observed in advance. Further, in the nursing home, it is preferable to observe a wandering tendency for the person in need of care and to take appropriate measures.

As a management method for a moving object in a indoor space such as a passage, there is a method where cameras or interrogators at regular intervals are provided; however, it is difficult to follow a flow line in real time and to observe tendency of the flow line. By a position detecting method using the semiconductor device of the invention and a plurality of interrogators, a position of the semiconductor device can be regularly detected, so that move of a moving object can be managed and recorded successively in real time. It is preferable that the manager can observe tendency of the flow line by recording the flow line, and storing and analyzing records; and can redesign layout of a room in which the flow line is obtained.

This embodiment can be freely implemented in combination with the aforementioned embodiment modes.

This application is based on Japanese Patent Application serial No. 2006-126880 filed in Japan Patent Office on Apr. 28, 2006, the entire contents of which are hereby incorporated by reference.

What is claimed is:

1. A semiconductor device comprising:
an antenna circuit receiving signals from a plurality of interrogators, the antenna circuit being configured to transmit a signal;
an amplifier circuit for amplifying the signal to transmit, the amplifier circuit being configured to change amplification degree;
a signal sorting portion for sorting the signals from the plurality of interrogators; and
a signal detecting portion for detecting intensity of the signals sorted by the signal sorting portion, the signal detecting portion including a rectifier circuit, an A/D conversion circuit and a central processing unit,
wherein the central processing unit is configured to calculate a distance between the semiconductor device and each of the plurality of interrogators, based on intensity of a signal output from the rectifier circuit for input to the central processing unit through the A/D conversion circuit, and
wherein the antenna circuit is configured to transmit, to the nearest interrogator to the semiconductor device among the plurality of interrogators, a signal including information on the intensity of the signals from the plurality of interrogators.

2. A semiconductor device according to claim 1, wherein the signals from the plurality of interrogators are different in frequency.

3. A semiconductor device according to claim 1,
wherein the signal sorting portion includes a frequency mixer, a bandpass filter, an oscillation circuit, and an oscillation frequency control circuit; and
wherein signals with different frequency, which are generated in the frequency mixer based on the signals from the plurality of interrogators and a signal from the oscillation circuit, are output to the rectifier circuit through the bandpass filter, so that the signals from the plurality of interrogators are sorted.

4. A semiconductor device according to claim 1, wherein the signal detecting portion includes a demodulation circuit and a baseband signal processing circuit which are for decoding the signals from the plurality of interrogators, which are sorted by the signal sorting portion.

5. A position detecting method for detecting position information of a semiconductor device, comprising the steps of:
receiving signals from a plurality of interrogators by an antenna circuit;
sorting the signals received by the antenna circuit by a signal sorting portion;
detecting intensity of the signal sorted by the signal sorting portion by a signal detecting portion wherein the signal detecting portion includes a rectifier circuit, an A/D conversion circuit and a central processing unit;
calculating a distance between the semiconductor device and each of the plurality of interrogators, based on intensity of a signal output from the rectifier circuit for input to the central processing unit through the A/D conversion circuit,
detecting intensity of signals from the plurality of interrogators;
amplifying a signal including information on the intensity of the signals from the plurality of interrogators at amplification degree based on intensity of signal from one of the plurality of interrogators;

transmitting, to the nearest interrogator to the semiconductor device among the plurality of interrogators, the signal including information on the intensity of the signals from the plurality of interrogators.

6. A position detecting method according to claim 5, wherein the signals from the plurality of interrogators are different in frequency.

7. A position detecting method according to claim 5, wherein the signal sorting portion includes a frequency mixer, a bandpass filter, an oscillation circuit, and an oscillation frequency control circuit; and wherein signals with different frequency, which are generated in the frequency mixer based on the signals from the plurality of interrogators and a signal from the oscillation circuit, are output to the rectifier circuit through the bandpass filter, so that the signals from the plurality of interrogators are sorted.

8. A position detecting method according to claim 5, wherein the signal detecting portion includes a demodulation circuit and a baseband signal processing circuit; and wherein the signals from the plurality of interrogators, which are sorted by the signal sorting portion are decoded.

9. A semiconductor device comprising:

an antenna circuit;

an amplifier circuit for amplifying a signal to transmit, the amplifier circuit being configured to change amplification degree;

an oscillation circuit;

a frequency mixer configured to multiply a signal from the antenna circuit by a signal from the oscillation circuit;

a bandpass filter configured to filter a signal from the frequency mixer;

a rectifier circuit configured to rectify the signal from the frequency mixer through the bandpass filter;

an A/D conversion circuit configured to convert a voltage of the rectified signal into a digital signal;

a central processing unit configured to calculate a distance between the semiconductor device and source of a signal received by the antenna circuit, based on the digital signal; and an oscillation frequency control circuit configured to control an oscillation frequency of the oscillation circuit, wherein the antenna circuit is configured to transmit, to the nearest interrogator to the semiconductor device among a plurality of interrogators, a signal including information on an intensity of signals from the plurality of interrogators.

* * * * *